(12) United States Patent
Gupta et al.

(10) Patent No.: US 11,878,709 B2
(45) Date of Patent: Jan. 23, 2024

(54) SUBCONSCIOUS BIG PICTURE MACRO AND SPLIT SECOND MICRO DECISIONS ADAS

(71) Applicant: TOYOTA MOTOR ENGINEERING & MANUFACTURING NORTH AMERICA, INC., Plano, TX (US)

(72) Inventors: Rohit Gupta, Santa Clara, CA (US); Ziran Wang, San Jose, CA (US); Kyungtae Han, Palo Alto, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 135 days.

(21) Appl. No.: 17/471,100

(22) Filed: Sep. 9, 2021

(65) Prior Publication Data
US 2023/0074573 A1 Mar. 9, 2023

(51) Int. Cl.
| | |
|---|---|
| *B60W 50/16* | (2020.01) |
| *B60W 50/12* | (2012.01) |
| *B60W 30/095* | (2012.01) |
| *B60W 30/14* | (2006.01) |
| *B60W 40/08* | (2012.01) |
| *B60W 40/105* | (2012.01) |
| *B60W 40/04* | (2006.01) |
| *B60W 50/14* | (2020.01) |

(52) U.S. Cl.
CPC ........ *B60W 50/16* (2013.01); *B60W 30/0956* (2013.01); *B60W 30/146* (2013.01); *B60W 40/04* (2013.01); *B60W 40/08* (2013.01); *B60W 40/105* (2013.01); *B60W 50/12* (2013.01); *B60W 2040/0818* (2013.01); *B60W 2050/143* (2013.01); *B60W 2540/229* (2020.02)

(58) Field of Classification Search
CPC ............. B60W 50/16; B60W 30/0956; B60W 30/146; B60W 40/04; B60W 40/08; B60W 40/105; B60W 50/12; B60W 2040/0818; B60W 2050/143; B60W 2540/229
See application file for complete search history.

(56) References Cited

U.S. PATENT DOCUMENTS

| | | |
|---|---|---|
| 8,478,642 B2 | 7/2013 | Dey |
| 8,615,357 B2 | 12/2013 | Simon |
| 9,648,107 B1 | 5/2017 | Penilla |
| 10,493,994 B1 | 12/2019 | Fields |

(Continued)

OTHER PUBLICATIONS

Q. Deng and D. Söffker, "Modeling and Prediction of Human Behaviors based on Driving Data using Multi-Layer HMMs," 2019 IEEE Intelligent Transportation Systems Conference (ITSC), 2019, pp. 2014-2019, doi: 10.1109/ITSC.2019.8917445.

(Continued)

*Primary Examiner* — Mohamed Barakat
(74) *Attorney, Agent, or Firm* — SHEPPARD, MULLIN, RICHTER & HAMPTON LLP; Hector A. Agdeppa; Daniel N. Yannuzzi

(57) ABSTRACT

Methods, vehicles, and systems described herein generate alerts based on a generated macro state level indicative of a traffic hazard risk in view of a set of parameters which may lead driver to make various sub-conscious decisions. The set of parameters can include at least one of a vehicle parameter, driver state parameter, or external parameter.

20 Claims, 12 Drawing Sheets

(56) References Cited

U.S. PATENT DOCUMENTS

| | | | |
|---|---|---|---|
| 10,614,726 B2 | 4/2020 | Harkness | |
| 2015/0217771 A1* | 8/2015 | Kelly | B60W 30/143 |
| | | | 701/93 |
| 2017/0021764 A1* | 1/2017 | Adams | G07C 5/0841 |
| 2017/0072851 A1* | 3/2017 | Shenoy | G08G 1/164 |
| 2017/0291543 A1 | 10/2017 | Goldman-Shenhar | |
| 2018/0127001 A1* | 5/2018 | Ricci | B60W 50/14 |
| 2019/0019412 A1 | 1/2019 | Roca | |
| 2019/0025843 A1 | 1/2019 | Wilkinson | |
| 2019/0213429 A1* | 7/2019 | Sicconi | G06F 3/012 |
| 2019/0243364 A1* | 8/2019 | Cohen | G06V 20/20 |
| 2021/0061299 A1 | 3/2021 | Wang | |

OTHER PUBLICATIONS

Z. Bai, W. Shangguan, B. Cai and L. Chai, "Deep Reinforcement Learning Based High-level Driving Behavior Decision-making Model in Heterogeneous Traffic," 2019 Chinese Control Conference (CCC), 2019, pp. 8600-8605, doi: 10.23919/ChiCC.2019.8866005.

* cited by examiner

| Vehicle Size | Vehicle Type | Time of Day | Road Type | Weather | Personal | Sensors | Age | Vehicle | Technology |
|---|---|---|---|---|---|---|---|---|---|
| Large | Truck | Early Morning | Freeway | Sunny | Stressed | Advanced | Teen | Tire pressure | Autonomous |
| Mid-Sized | SUV | Noon | Highway | Rainy | Tired | Basic | 20s | Brakes | Semi-autonomous |
| Compact | Sedan | Afternoon | 2-way highway | Hail | Alert | Few | 30-50s | Liquids | Standard |
| Mini | Motorcycle | Evening | Expressway | Icy | Distracted | None | 50s-68 | Suspension | Legacy |
| | Bicycle | Night | Urban street | Snow | Intoxicated | | >68 | Engine | Connected |
| | | Midnight | Rural street | Stormy | Medicated | | | Safety equipment | Unconnected |
| | | | Alley | High Winds | Angry | | | Battery | |
| | | | Farm road | Very Hot | Calm | | | | |
| | | | | Very cold | | | | | |

SUBCONSCIOUS BIG PICTURE MACRO AND SPLIT SECOND MICRO DECISIONS ADAS

TECHNICAL FIELD

The present disclosure relates generally to advanced driver-assistance systems (ADAS), and more particularly to systems and methods for improving the safety of vehicles in view of various macro-level decisions of drivers.

BACKGROUND OF THE INVENTION

Drivers make various subconscious, and/or "big-picture" decisions that may affect their risk for getting into accidents, such as the choice of which vehicle to drive or the time of day for driving. Drivers make various in-the-moment decisions, such as those in response to observing (frequently unexpected) obstacles (whether another incoming vehicle, a vehicle that suddenly stopped, a pedestrian, etc.), or in response to various lifestyle choices they face (such as answering the phone while driving). Drivers may be aware these in-the moment decisions may lead to life or property saving outcomes. Systems have been developed for the vehicle to respond to situations which can warrant in-the moment driver decisions, such as ADAS that can maneuver the vehicle in response to unexpected obstacles, e.g. braking or merging vehicles.

BRIEF SUMMARY OF THE DISCLOSURE

As previously alluded to, various decisions may affect how a driver drives and affect the driver's risk for getting into accidents. Sub-conscious decisions, which may not necessarily be made in response to specific events while driving, are macro-level decisions. The present disclosure captures macro-level driver decisions (to be explained in more detail below), various parameters that may lead drivers to make various macro-level decisions, and/or the driving risk associated with those factors, in a macro state level. In other words, the present disclosure can allow for determining the macro state level based at least on values of one or more parameters that may lead drivers to make various macro-level decisions. As such, the macro state level can be indicative of a traffic hazard risk in view of the parameters which may lead driver to make various sub-conscious decisions. Macro-level decisions may not necessarily be illegal or go against conventional norms. Example macro-level decisions can include, decisions about what type of vehicle to drive, what time to drive, and on what occasion. For example, driving a pick-up truck on a highway vs. a moped or a scooter is a macro-level decision. Another macro-level decision may be driving during the day vs. the night. Another macro-level decision can be to drive around 1 pm in the afternoon in low traffic. In most cases, macro-level decisions are made at the subconscious level and hence are not captured by driving statistics. In other words, a driver may not be consciously aware that macro-level decision can affect the risk of accidents. When asked why someone made those decisions, the driver's overt response may be based on personal preference, the driver's personal schedule. The driver may not consciously base these decisions on the risk for getting into accidents. As such, such decisions may not be reported or captured in driving statistics related to vehicle accidents. A macro state level can include one or more levels for traffic hazard risk, where each level can illicit a corresponding macro-level decision. Decisions drivers make in the moment, while driving, such as in response to observing (frequently unexpected) obstacles (whether another incoming vehicle, a vehicle that suddenly stopped, a pedestrian, etc.) are micro-level decisions. The present disclosure captures the various risks or events that may lead a driver to make a micro-level decision in a micro state level. Micro-level decisions include decisions drivers make in the moment, such as in response to observing an obstacle, whether another incoming vehicle, a vehicle that suddenly stopped, a pedestrian, etc. A micro-level decision can include a driver's decision upon seeing a slow-moving construction vehicle in front of him or her, that that driver did not expect to be there. The driver may be consciously aware that a micro-level decisions can have life-saving or a life-threatening outcome. As such, the driver's response to the conditions that lead to the micro-level decisions, and the conditions themselves, may generally be captured by driving statistics (such as accident rate or fatality based statistics). A driver may also be aware (e.g. from being aware of various statistics), that various lifestyle or in-the moment choices while driving can have life-threatening outcomes. For example various decisions a driver makes can lead to distracted driving (e.g. talking or making a call on a cell phone, texting or reading a text message, eating, fiddling with the car radio, CD player, etc., entering destination information into a GPS system, attending to children or pets). Decisions that may lead to distracted driving can be captured by statistics (e.g. by forensics, witness accounts, asking the driver). Similarly, decisions that lead to driving against written or unwritten (i.e. by convention) rules (e.g. running a red light or stop sign, driving under the influence of alcohol, drugs, or medicines, speeding) can also contribute to catastrophic accidents, and can also be captured by statistics. Similarly, a driver may also be aware of various driver states which can impede driving, such as emotional distress, physical or mental fatigue. These too can may be captured by statics and contribute to the micro state level.

What is needed is for a vehicle system to address conditions that warrant macro-level decisions, independently, and in view of micro-level decisions and the micro state level. The present disclosure captures micro-level and macro-level decisions (i.e. "big-picture" level decisions made sub-consciously). Micro-level decisions may be addressed by an ADAS and not necessarily by the reaction of the driver. In other words, the present disclosure may allow for micro-level decisions to be addressed by an ADAS. The present disclosure addresses, higher level (bigger picture) macro-level decisions (such as on what and when to drive), and micro-level decisions on what to do when encountering hazardous situations. In some embodiments, the driver may be forced to respond to events that may trigger micro-level decisions in micro-seconds or milliseconds. In some embodiments, the system's response to the proactive detection of a micro-level driving condition may, depend on the macro-level state (i.e. the state of the bigger picture).

The present disclosure includes systems, vehicles and computer implemented methods for determination of a macro state level of a vehicle. Methods disclosed herein can be executed at a perception system, and a processing component having a memory and a processor that can access the memory and execute machine-executable instructions stored in the memory, to perform operations. The methods can include receiving, one or more values for a parameter set. The parameter set can include at least one of vehicle parameter, driver state parameter, or external parameter. The methods can include generating, a macro state level indicative of a traffic hazard risk based on the received value(s).

The methods can include generating an alert based on the macro state level. The methods can include generating a control signal for a vehicle based on the macro state level.

In methods disclosed herein, the control signal for the vehicle can prevent control of the vehicle by a driver. In methods disclosed herein, the control signal for the vehicle can adjust (e.g. disable, enable, or escalate) the alert based on a autonomy level of the vehicle. Methods disclosed herein can include detecting, by a perception system, a micro state level indicative of an immediate hazard requiring a short term vehicle maneuver. The generated control signal can be configured disable control of the vehicle in response to detection of the micro state level.

Methods disclosed herein can include updating the values for the parameter set and the macro state level. Methods disclosed herein can include generating the control signal only after escalation of a macro state level. In methods disclosed herein, the control signal for the vehicle can be a maximum speed for the vehicle. The maximum speed can depend on a value for the one or more parameters. The methods disclosed herein can include comprising, updating the values for the parameter set based on an outcome of performing a vehicle maneuver according to the control signal. The methods include comparing the received value for the at least one parameter to a dataset. The methods can include generating the macro state level based on the comparison. The parameter set can include a vehicle parameter that includes at least a value for an autonomy level of the vehicle. The parameter set can include a time of day parameter. The parameter set can include the vehicle parameter, the driver state parameter, and a time of day parameter.

Aspects of the present disclosure include vehicles and systems. Vehicles and systems can include a memory storing machine-executable instructions. Vehicles and systems can include a processor configured to access the memory and execute the machine-executable instructions to perform a set of operations. The set of operations can include operations to receive, one or more values for a parameter set. The parameter set can include at least one of vehicle parameter, driver state parameter, or external parameter. The parameters of the parameter set can be indicative of parameters which may lead drivers to make various sub-conscious decisions. The set of operations can include operations for generating, a macro state level based on the received value(s) for the parameter set. The macro state level can be indicative of a traffic hazard risk in view of the set of the parameters which may lead driver to make various sub-conscious decisions.

The set of operations can include operations for generating an alert based on the macro state level. The operations can include operations for generating a control signal for a vehicle based on the macro state level. The control signal for the vehicle is configured to prevent control of the vehicle by a driver. The control signal for the vehicle can be configured to adjust the alert based on a autonomy level of the vehicle.

The set of operations can include detecting, by a perception system, a micro state level indicative of at least one of a driver distraction or an immediate hazard requiring a short term vehicle maneuver. The generated control signal is configured to disable control of the vehicle in response to detection of the micro state level. The generated control signal can include updating the values for the parameter set and the macro state level. The set of operations can include generating the control signal only after escalation of a macro state level.

In some example implementations, the control signal for the vehicle is a maximum speed for the vehicle, and where the maximum speed depends on a value for the one or more parameters. In some embodiments, the set of operations include updating the values for the parameter set based on an outcome of performing a vehicle maneuver according to the control signal.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates example factors that can contribute to a determination of a macro state level of a vehicle, in accordance with one or more embodiments herein.

Figure 1:
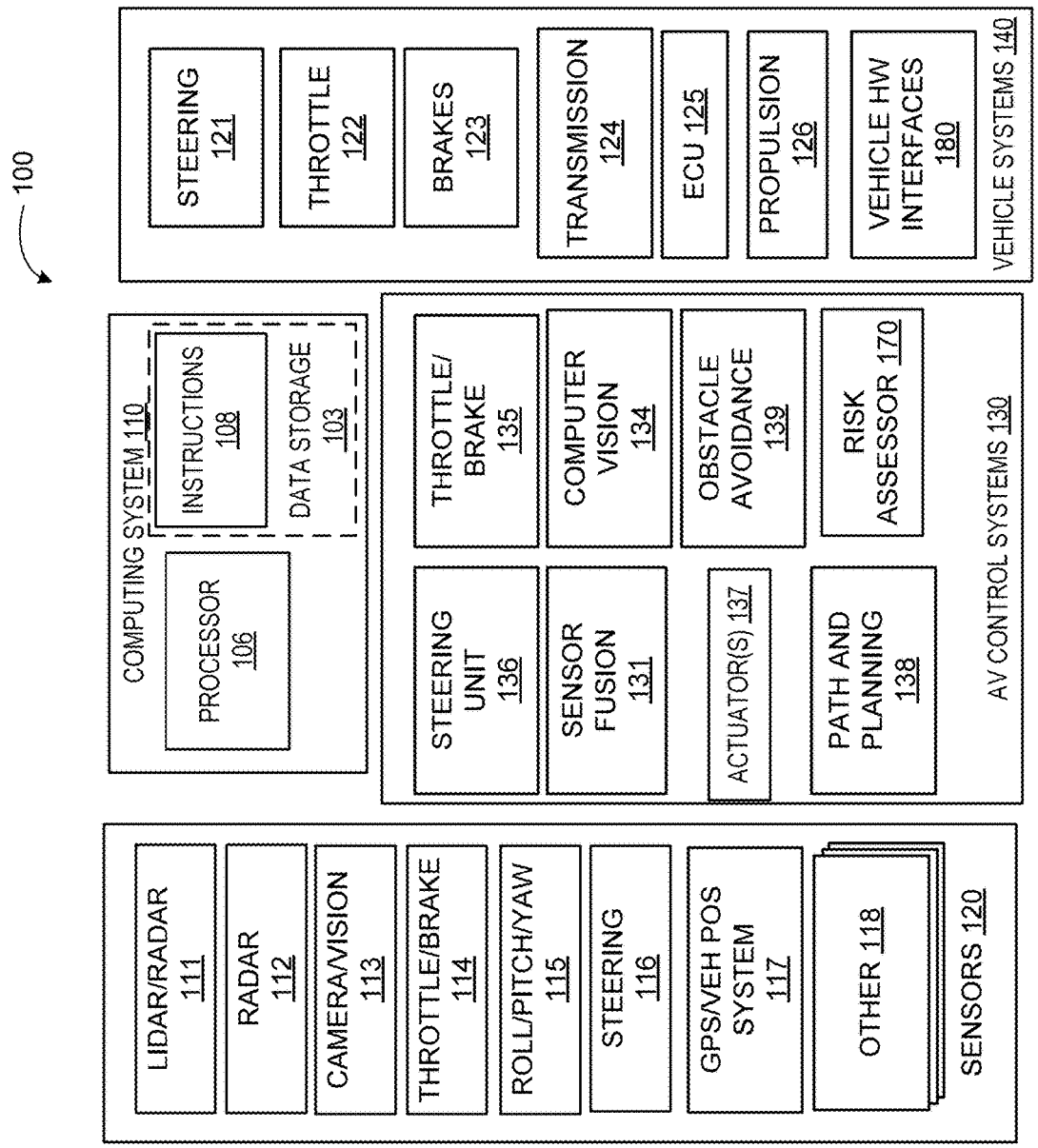
FIG. 1 illustrates an example vehicle with which embodiments of the disclosed technology may be implemented.

The figures are not exhaustive and do not limit the present disclosure to the precise form disclosed.

DETAILED DESCRIPTION

As alluded to above, it may be important for a vehicle system to address both micro-level decisions as well as macro-level decisions. As such, a micro state level can be determined based on aspects that affect micro-level decisions, and macro state level can be determined based on factors that may affect macro-level decisions. The macro/macro state level can be generated based on values of one or more parameters, such as parameters specific to the vehicle, parameters specific to the driver, and parameters specific to the road traffic network (driving hazards, environmental parameters, etc.).

A macro-level decision, can include decisions on or based on vehicle type, time of travel, familiarity (i.e. with the road and/or vehicle), direction of travel, weather condition, traffic situation, road condition. Vehicle type may include whether the vehicle is a truck, sedan, sport utility vehicle (SUV), bus, van, mini-van, car, motorcycle, scooter, moped, bicycle, unicycle, etc. For example, a driver may own both, and may have a choice between riding a motorcycle or a sedan. One example "bad" macro-level decision may include selecting to drive a moped on a highway, even though the driver does not have a helmet, or has a choice of selecting a truck or sedan vehicle. Time of travel include whether it is the early morning, late morning, noon, afternoon, early evening, late evening, night, or midnight. For example, a driver may have a choice of leaving in the early morning (maybe when he is more tired, with more traffic, and in the direction of the sun which can affect visibility) or late morning. Familiarly may include how familiar the driver may be with the vehicle, the surroundings, the road, etc. Direction of travel may include if the vehicle is heading with or against traffic, towards or against a major destination. Vehicle condition may include great (new), good, okay, marginal, or poor. Weather conditions can include sunny, windy, rainy, hail, snowy, and/or icy. The traffic situation can include, light, moderate, heavy, city, highway, rural, or mixed traffic. The road condition can include great (e.g. autobahn), good, moderate, adequate, poor, or mixed. It can be appreciated that macro-level decisions are not limited to what is included herein. In can be appreciated that such decisions may or may not generally be appreciated by drivers as contributing to safety on the road. For example, while some drivers may consider weather and traffic as important conditions, others may not. These are merely non-limiting examples of macro-level decisions.

It can also be appreciated that one or more macro-level decisions can affect the macro-level state of the vehicle or driver. For example, driving at midnight (low visibility, tiredness may be contributing factors) on a highway with truck traffic in an old, dated car, may be bad idea regardless of outcomes. Thus the macro-level state can be categorized as a bad, or severe risk "macro" decision. It can also be appreciated that micro-level decisions can also affect the micro state and vice versa, (e.g. driving after an accident may affect the vehicle condition, or driving in traffic or low visibility, e.g., at night, may negatively affect your mental or emotional state). It can also be appreciated that micro-level decisions may be independent from macro-level decisions. For example, a driver may be driving a mid-sized pick-up truck at 1 pm in light traffic on a freeway going at the speed limit (e.g. 50-65 mph). These may generally be categorized as good macro-level decisions (e.g. the truck is study and safe compared to other personal vehicles, the early afternoon, on a good quality highway without traffic). Suddenly, there is a fast moving construction vehicle in front of the driver that the driver did not expect or see. The truck could hit the construction vehicle and flip over. In this example, the bad micro-level even may have resulted in tragedy regardless of the macro-level event or macro-level status.

In the above example, and in other examples, there is not much a human, of any driving experience, can do to deal with fast, sudden, unexpected events. Humans cannot react and act fast enough to make micro-second decisions. The 'micro-second' type events can mostly be solved by technology. A micro-level decision circuit can include one or more sensors and/or systems for detecting driving under influence (DUI), identifying visual, manual, and cognitive distractions, identifying potential and actual traffic violations, identifying wither turn signals are used for turning or lane-changing, identifying errors while changing merging lanes, and proactively identifying potential hazards before the potential hazards become immediate hazards, and identifying immediate hazards and obstacles.

A micro-level circuit may allow detecting and for responding to such micro-level decisions, such as minimizing visual, manual, and cognitive distractions, or respond to proactively identified hazards and obstacles. A macro-level circuit may allow for detecting and responding to (such as by risk mitigation) macro-level threats. As such, systems and methods described herein may allow for detecting, alerting of, and responding to macro and micro-level states. Macro-level states can depend on one or more factors of the vehicle, a vehicle environment (such as a road traffic network), and/or of driver. Aspects of the present disclosure may become especially important as the road traffic network becomes mixed, such as road traffic networks with connected, autonomous, semi-autonomous vehicles, but also legacy vehicles. Drivers, owners, operators of vehicles can navigate their surroundings in many ways, (e.g. by one or more owned or shared vehicles, of varying types, or by a transportation service). Aspects of the present disclosure may become important especially as a driver's choices on how to navigate a road traffic network increase.

Vehicle Systems

FIG. 1 illustrates an example connected vehicle, and/or autonomous or semi-autonomous vehicle with which embodiments of the disclosed technology may be implemented. As described herein, vehicle 100 can refer to a vehicle, whereby the vehicle 100 and the vehicle 100 components In this example, vehicle 100 includes a computing system 110, sensors 120, AV control systems 130 and vehicle systems 140. Either of the computing system 110, sensors 120, AV control systems 130, and/or vehicle systems 130 can be part of an automated vehicle system/advanced driver assistance system (ADAS). ADAS can provide navigation control signals (e.g. control signals to actuate the vehicle and/or operate one or more vehicle systems 140 as shown in FIG. 1) for the vehicle to navigate a variety of situations. As used herein, ADAS can be an autonomous vehicle control system adapted for any level of vehicle control and/or driving autonomy. For example, the ADAS can be adapted for level 1, level 2, level 3, level 4, and/or level 5 autonomy (according to SAE standard). ADAS can allow for control mode blending (i.e. blending of autonomous and/or assisted control modes with human driver control). ADAS can correspond to a real-time machine perception system for vehicle actuation in a multi-vehicle environment. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. Although various sensors are shown, it can be understood that systems and methods for detecting and responding to macro state level do not require many sensors, if at all. It can also be understood that system and methods described herein can be augmented by sensors off the vehicle 100. In this example, sensors 120 include light detection and ranging (LiDAR) sensor 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as LiDAR sensor 111, radar 112, IR sensors and other like sensors can be used to gather data to measure distances and closing rates to various external objects such as other vehicles, traffic signs, pedestrians, light poles and other objects. Image sensors 111 can include one or more cameras or other image sensors to capture images of the environment around the vehicle as well as internal to the vehicle. Information from image sensors 113 (e.g. camera) can be used to determine information about the environment surrounding the vehicle 100 including, for example, information regarding other objects surrounding vehicle 100. For example, image sensors 113 may be able to recognize specific vehicles (e.g. color, vehicle type), landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data, or information from positioning system 117 to determine, refine, or verify vehicle (ego vehicle or another vehicle) location as well as detect one or more macro state levels.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Other sensors 118 may be provided as well. Other sensors 118 can include vehicle acceleration sensors, vehicle speed sensors, wheelspin sensors (e.g. one for each wheel), a tire pressure monitoring sensor (e.g. one for each tire), vehicle clearance sensors, left-right and front-rear slip ratio sensors, and/or environmental sensors (e.g. to detect weather, traction conditions, or other environmental conditions. Other sensors 118 can be further included for a given implementation of ADAS. Other sensors 118 can include sensors within a cabin of the vehicle, such as sensors that detect one or more passengers in a cabin of the vehicle. Various sensors 120, such as other sensors 118 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 can include, autonomous driving module (not shown), steering unit 136, throttle and brake control unit 135, sensor fusion module 131, computer vision module 134, path and/or planning module 138, obstacle avoidance module 139, risk assessment module 170 and actuator(s) 137. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on. Computer vision module 134 may be able to model the road traffic vehicle network, predict incoming hazards and obstacles, predict road hazard, and determine one or more contributing factors to macro state levels. Computer vision module 134 may be able to perform depth estimation, image/video segmentation, camera localization, and object classification according to various classification techniques (including by applied neural networks).

Path and/or planning module 138 may be included to compute a desired path for vehicle 100 based on input from various other sensors and systems. For example, path and/or planning module 138 can use information from positioning system 117, sensor fusion module 131, computer vision module 134, obstacle avoidance module 139 (described below) and other systems (e.g. AV control systems 130, sensors 120, and/or vehicle systems 140) to determine a safe path to navigate the vehicle along a segment of a desired route. Path and/or planning module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with path and/or planning module 138 to determine an appropriate path to avoid a detected obstacle.

Path and/or planning module 138 (either alone or in conjunction with one or more other module of AV Control system 130, such as obstacle avoidance module 139, computer vision module 134, and/or sensor fusion module 131) may also be configured to perform and/or coordinate one or more vehicle maneuver. Example vehicle maneuvers can include at least one of a path tracking, stabilization, or collision avoidance maneuver. In connected vehicles, such vehicle maneuvers can be performed at least partially cooperatively.

Vehicle systems 140 may include a plurality of different systems/subsystems to control operation of vehicle 100. In this example, vehicle systems 130 include steering system 121, throttle system 122, brakes 123, transmission 124, electronic control unit (ECU) 125 and propulsion system 126, vehicle hardware interfaces 180. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. When control is assumed, computing system 110 and/or av control system 130 can provide vehicle control systems to vehicle hardware interfaces for controlled systems such as steering angle 121, brakes 123, throttle 122, or other hardware interfaces 180 such as traction force, turn signals, horn, lights, etc. This may also include an assist mode in which the vehicle takes over partial control or activates ADAS controls (e.g. AC control systems 130) to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes. For example, memory 103 can include data that has been communicated to the ego vehicle (e.g. via V2V communication), mapping data, a model of the current or predicted road traffic vehicle network, vehicle dynamics data, computer vision recognition data, and/or other data which can be useful for the execution of one or more vehicle maneuvers, for example by one or more modules of the av control systems 130.

Although one computing system 130 is illustrated in FIG. 1, in various embodiments multiple computing systems 110 can be included. Additionally, one or more systems and subsystems of vehicle 100 can include its own dedicated or shared computing system 130, or a variant thereof. Accordingly, although computing system 110 is illustrated as a discrete computing system, this is for ease of illustration only, and computing system 110 can be distributed among various vehicle systems or components.

Vehicle 100 may also include a (wireless or wired) communication system (not illustrated) to communicate with other vehicles, infrastructure elements, cloud components and other external entities using any of a number of communication protocols including, for example, V2V, V2I (vehicle-to-infrastructure) and V2X protocols. Such a wireless communication system may allow vehicle 100 to receive information from other objects including, for example, map data, data regarding infrastructure elements, data regarding operation and intention of surrounding vehicles, and so on. A wireless communication system may allow vehicle 100 to receive updates to data that can be used to execute one or more vehicle control modes, and/or vehicle control algorithms as discussed herein. Wireless communication system may also allow vehicle 100 to transmit information to other objects and receive information from other objects (such as other vehicles, user devices, or infrastructure). In some embodiments, one or more communication protocol or dictionaries can be used, such as the SAE J2735 V2X Communications Message Set Dictionary. In some embodiments, the communication system may be useful in retrieving and sending one or more data useful in generating macro and micro state levels disclosed herein.

Communication system can be configured to receive data and other information from sensors 120 that is used in determining whether and to what extent control mode blending should be activated. Additionally, communication system can be used to send an activation signal or other activation information to various vehicle systems 140 and/or AV control systems 130 as part of controlling the vehicle. For example, communication system can be used to send signals to one or more of the vehicle actuators 137 to control parameters, for example, maximum steering angle, throttle response, vehicle braking, torque vectoring, and so on.

In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

Path and/or planning module 138 can allow for executing one or more vehicle control mode(s), and/or vehicle control algorithms in accordance with various implementations of the systems and methods disclosed herein.

In operation, path and and/or planning module 138 (e.g. by a driver intent estimation module, not shown) can receive information regarding human control input used to operate the vehicle. As described above, information from sensors 120, actuators 137 and other systems can be used to determine the type and level of human control input. Path and/or planning module 138 can use this information to predict driver action. Path and/or planning module 138 can use this information to generate a predicted path and model the road traffic vehicle network. This may be useful in determining values for one or more macro state level contributing factors (such as road quality, traffic, etc.). As also described above, information from sensors, and/or other systems can be used to determine the state of the driver. Eye state tracking, attention tracking, or intoxication level tracking, for example, can be used to estimate driver state. It can be understood that the driver state can influence the macro and/or micro state as disclosed herein. Micro/macro state levels as disclosed herein, can include or be based on the driver state. Driver state can be provided to a risk assessment module 170 to determine the level of risk associated with a vehicle operation and determine the micro/macro state level. Although not illustrated in FIG. 1, where the assessed risk, and/or the macro/micro state level(s) is above (or at) a determined threshold, a warning signal can be provided to a driver interface to alert the driver (e.g., audibly or visually) of the risk. Aspects of these warnings will be disclosed with reference to subsequent figures.

Path and/or planning module 138 can receive state information such as, for example from visibility maps, traffic and/or weather information, hazard maps, and local map views. Information from a navigation system can also provide a mission plan including maps and routing to path and/or planning module 138.

The path and/or planning module 138 (e.g. by a driver intent estimation module, not shown) can receive this information and predict behavior characteristics within a future time horizon. This information can be used by path and/or planning module 138 for executing one or more planning decisions. Planning decisions can be based on one or more policy (such as defensive driving policy). Planning decisions can be based on one or more level of autonomy, connected vehicle actions, one or more policy (such as defensive driving policy, cooperative driving policy, such as swarm or platoon formation, leader following, etc.). Path and/or planning module 138 can generate an expected model for the road traffic hazards and assist in creating a predicted traffic hazard level.

Path and/or planning module 138 can receive risk information from risk assessment module 170. Path and/or planning module 138 can receive vehicle capability and/or capacity information from one or more vehicle systems 140. Vehicle capability can be assessed, for example, by receiving information from vehicle hardware interfaces 180 to determine vehicle capabilities and identify a reachable set model. Path and/or planning module 138 can receive surrounding environment information (e.g. from computer vision module 134, and/or obstacle avoidance module 139). Path and/or planning module 138 can apply risk information and/or vehicle capability and/or capacity information to trajectory information (e.g. based on a planned trajectory and/or driver intent) to determine a safe or optimized trajectory for the vehicle given the drivers intent, policies (e.g. safety or vehicle cooperation policies), communicated information, and given one or more obstacles in the surrounding environment. This trajectory information can be provided to controller (e.g. ECU 125) to provide partial or full vehicle control in the event of a risk level above threshold. A signal from risk assessment module 170 can be used generate macro state levels described herein. A signal from risk assessment module 170 can trigger ECU 125 or another AV control system 130 to take over partial or full control of the vehicle.

Figure 2:
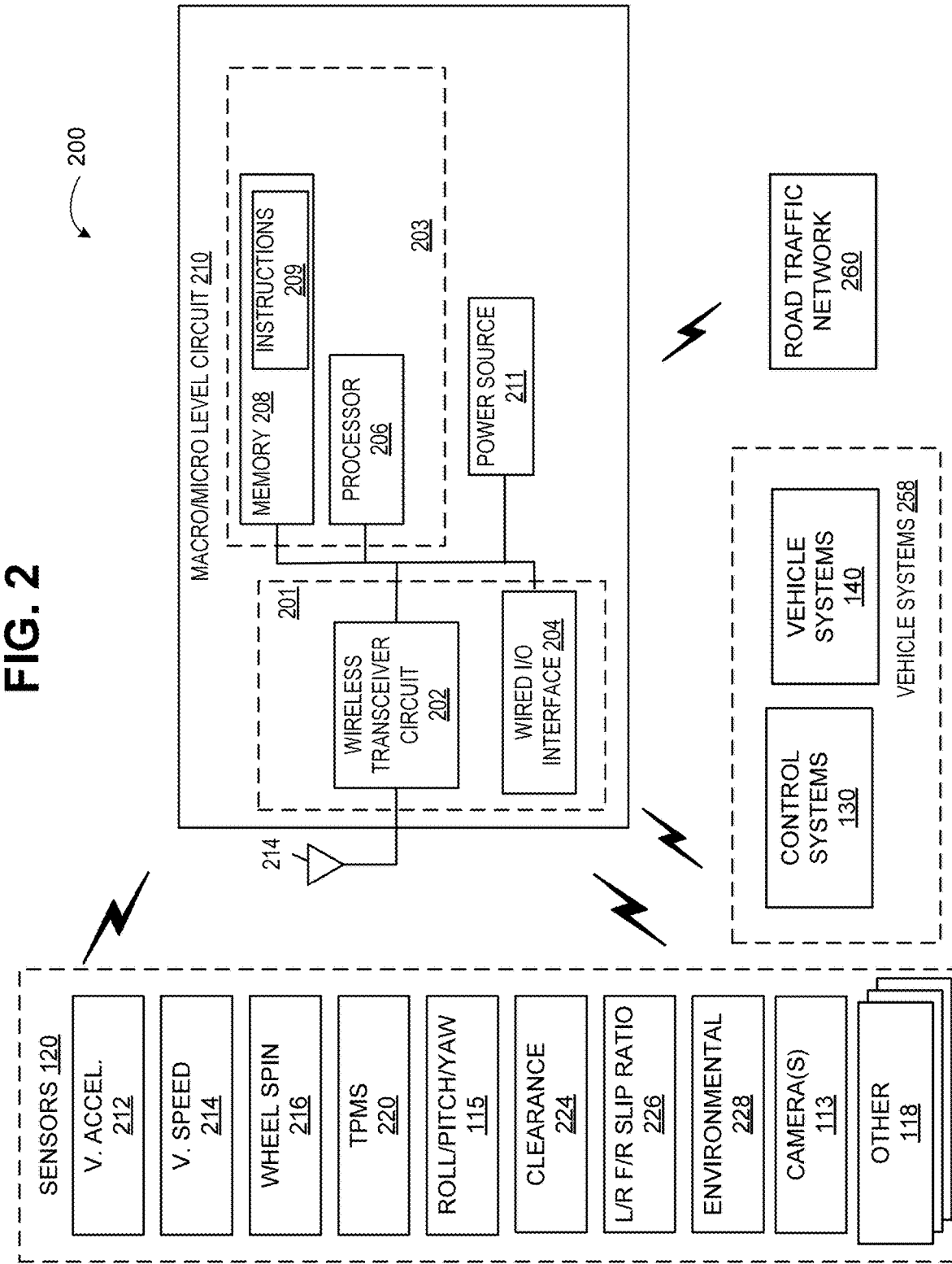
FIG. 2 illustrates an example architecture of a system for detecting and responding to the macro state level of a vehicle according to embodiments of the present disclosure.

FIG. 2 illustrates an example architecture for generating and responding to macro/micro-levels described herein. Referring now to FIG. 2, in this example, a macro/micro-level state detection and response system 200 includes an macro/micro-level state detection and response circuit 210, a plurality of sensors 120, and a plurality of vehicle systems 258. Also included are various elements of road traffic network 260 with which the macro/micro-level state detection and response system 200 can communicate. It can be understood that a road traffic network 260 can include various elements that are navigating and/or important in navigating a road traffic network, such as vehicles, pedestrians (with or without connected devices that can include aspects of macro/micro-level state detection and response system 200 disclosed herein), or infrastructure (e.g. traffic signals, sensors, such as traffic cameras, databases, central servers, weather sensors). Other elements 260 can include connected elements at workplaces, or the home (such as vehicle chargers, connected devices, appliances, etc.).

Macro/micro-level state detection and response system 200 can be implemented as and/or include one or more components of the vehicle 100 shown in FIG. 1. Sensors 120, vehicle systems 258, and elements of road traffic network 260, can communicate with the macro/micro-level state detection and response circuit 210 via a wired or wireless communication interface. As previously alluded to, elements of road traffic network 260 can correspond to connected or unconnected devices, infrastructure (e.g. traffic signals, sensors, such as traffic cameras, weather sensors), vehicles, pedestrians, obstacles, etc. that are in a broad or immediate vicinity of ego-vehicle (e.g. vehicle 100) or otherwise important to the navigation of the road traffic network (such as remote infrastructure). Although sensors 120, vehicle systems 258, and road traffic network 260, are depicted as communicating with macro/micro-level state detection and response circuit 210, they can also communicate with each other, as well as with other vehicle systems 258 and/or directly with element of a road traffic network 260. Data as disclosed herein can be communicated to and from the macro/micro-level state detection and response circuit 210. For example, various infrastructure (example element of road traffic network 260) can include one or more databases, such as vehicle crash data or weather data. This data can be communicated to the circuit 210, and can such data can be updated based on outcomes for one or more maneuvers or navigation of the road traffic network, vehicle telematics, driver state (physical and mental), vehicle data from sensors 120 (e.g. tire pressure or brake status) from the vehicle. Similarly, traffic data, vehicle state data, time of travel, demographics data for drivers can be retrieved and updated. All of this data can be included in and/or contribute to predictive analytics (e.g. by machine learning) of accident possibility, and determinations of road hazard conditions and macro state levels. Similarly, models, circuits, and predictive analytics can be updated according to various outcomes.

Macro/micro-level state detection and response circuit 210 can generate a macro and/or micro state level as described herein, and generate signals corresponding to one or more desired responses to those levels (such as alerts and/or input control signals which will be described herein). As will be described in more detail herein, the macro state level can have one or more contributing factors. Various sensors, vehicle systems 258, or road traffic network 260 elements may contribute to gathering data for generation of the macro state level. For example, the driver state may be macro/micro-level state detection and response circuit 210 can include at least one of a macro-level state detection circuit, a macro-level response circuit, a micro-level state detection circuit, or a micro-level response circuit. The macro/micro-level state detection and response circuit 210 can be implemented as an ECU or as part of an ECU such as, for example electronic control unit 125. In other embodiments, macro/micro-level state detection and response circuit 210 can be implemented independently of the ECU, for example, as another vehicle system.

Macro/micro-level state detection and response circuit 210 can be configured to create macro and/or micro state levels, and appropriately respond. Macro/micro-level state detection and response circuit 210 in this example includes a communication circuit 201, a decision and control circuit 203 (including a processor 206 and memory 208 in this example), a power source 211 (which can include power supply) and macro/micro-level state detection and response circuit 210. It is understood that the disclosed macro/micro-level state detection and response circuit 210 can be compatible with and support one or more standard or non-standard messaging protocols.

Components of macro/micro-level state detection and response circuit 210 are illustrated as communicating with each other via a data bus, although other communication interfaces can be included. Decision and control circuit 203 can be configured to control one or more aspects of macro state level detection and response. Decision and control circuit 203 can be configured to execute one or more steps described with reference to FIGS. 7A-7D.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions 209 that may be used by the processor 206 to execute one or more functions of macro/micro-level state detection and response circuit 210. For example, data and other information can include vehicle driving data, such as a determined familiarity of the driver with driving and the vehicle. The data can also include values for signals of one or more sensors 120 useful in determining the macro and/or micro state level. Operational instruction 209 can contain instructions for executing logical circuits, models, and/or methods as described herein.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up an macro/micro-level state detection and response circuit 210. Components of decision and control circuit 203 can be distributed among two or more decision and control circuits 203, performed on other circuits described with respect to macro/micro-level state detection and response circuit 210, be performed on devices (such as cell phones) performed on a cloud-based platform (e.g. part of infrastructure), performed on distributed elements of the road traffic network 260, such as at multiple vehicles, user device, central servers, performed on an edge-based platform, and/or performed on a combination of the foregoing.

Communication circuit 201 either or both a wireless transceiver circuit 202 with an associated antenna 214 and a wired I/O interface 204 with an associated hardwired data port (not illustrated). As this example illustrates, communications with macro/micro-level state detection and response circuit 210 can include either or both wired and wireless communications circuits 201. Wireless transceiver circuit 202 can include a transmitter and a receiver (not shown), e.g. a broadcast mechanism, to allow wireless communications via any of a number of communication protocols such as, for example, WiFi (e.g. IEEE 802.11 standard), Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by macro/micro-level state detection and response circuit 210 to/from other components of the vehicle, such as sensors 120, vehicle systems 258, infrastructure (e.g. servers cloud based systems), and/or other devices or elements of road traffic network 260. These RF signals can include information of almost any sort that is sent or received by vehicle.

Wired I/O interface 204 can include a transmitter and a receiver (not shown) for hardwired communications with other devices. For example, wired I/O interface 204 can provide a hardwired interface to other components, including sensors 120, vehicle systems 258. Wired I/O interface 204 can communicate with other devices using Ethernet or any of a number of other wired communication protocols whether standardized, proprietary, open, point-to-point, networked or otherwise.

Power source 211 such as one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, another vehicle battery, alternator, etc.), an energy harvester (e.g., solar cells, piezoelectric system, etc.), or it can include any other suitable power supply. It is understood power source 211 can be coupled to a power source of the vehicle, such as a battery and/or alternator. Power source 211 can be used to power the macro/micro-level state detection and response circuit 210.

Sensors 120 can include one or more of the previously mentioned sensors 120. It Sensors 120 can include one or more sensors that may or not otherwise be included on a standard vehicle (e.g. vehicle 100) with which the macro/micro-level state detection and response circuit 210 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, environmental sensors 228 (e.g., to detect weather, salinity or other environmental conditions), and camera(s) 213 (e.g. front rear, side, top, bottom facing). Additional sensors 118 can also be included as may be appropriate for a given implementation of macro/micro-level state detection and response system 200.

Vehicle systems 158 can include any of a number of different vehicle components or subsystems used to control or monitor various aspects of the vehicle and its performance. For example, it can include any or all of the aforementioned vehicle systems 140 and/or control systems 130 shown in FIG. 1. In this example, the vehicle systems 158 include a GPS or other vehicle positioning system 172.

During operation, macro/micro-level state detection and response circuit 210 can receive information from various vehicle sensors 152, vehicle systems 158, and/or road traffic network 260 to determine the macro and/or micro state level. Also, the driver, owner, and/or operator of the vehicle may manually trigger one or more processes described herein for detecting a macro and/or micro state level. Communication circuit 201 can be used to transmit and receive information between macro/micro-level state detection and response circuit 210, sensors 152, macro/micro-level state detection and response circuit 210 and/or vehicle systems 158. Also, sensors 152 and/or macro/micro-level state detection and response circuit 210 may communicate with vehicle systems 158 directly or indirectly (e.g., via communication circuit 201 or otherwise). Communication circuit 201 can be used to transmit and receive information between macro/micro-level state detection and response circuit 210, one or more other systems of a vehicle 100, but also other elements of a road traffic network 260, such as vehicles, devices (e.g. mobile phones), systems, networks (such as a communications network and/or central server), and/or infrastructure.

In various embodiments, communication circuit 201 can be configured to receive data and other information from sensors 120 and/or vehicle systems 258 that is used in determining the macro and/or micro state level. As one example, when data is received from a an element of road traffic network 260 (such as from a driver's user device), communication circuit 201 can be used to send an activation signal and/or activation information to one or more vehicle systems 258 or sensors 120 for the vehicle to provide certain responsive information. For example, it may be useful for vehicle systems 258 or sensors 120 to provide data useful in determining the macro state level herein. Alternatively, macro/micro-level state detection and response circuit 210 can be continuously receiving information from vehicle system 258, sensors 120, other vehicles, devices and/or infrastructure (e.g. those that are elements of road traffic network 260). Further, upon determination of a macro state level, communication circuit 201 can send a signal to other components of the vehicle, infrastructure, or other elements of the road traffic network based on the determination of the macro-state. For example, the communication circuit 201 can send a signal to a vehicle system 258 that indicates a control input for performing one or more vehicle maneuvers and/or preventing a human control input according to the macro state level and/or micro state. In some embodiments upon detecting a hazard that requires split-second decision from the driver, depending on the determined macro state level, the driver's control of the vehicle can be prohibited, and control of the vehicle can be offloaded to the ADAS. In more specific examples, upon detection of a hazard (e.g. by sensors 120, and/or vehicle system 258 or by elements of the road traffic network 260), one or more signals can be sent to a vehicle system 250, so that an assist mode can be activated and the vehicle can control one or more of vehicle systems 140 (e.g. steering system 121, throttle system 122, brakes 123, transmission 124, ECU 125 and propulsion system 126, suspension, and powertrain).

The examples of FIGS. 1 and 2 are provided for illustration purposes only as examples of vehicles and macro/micro-level state detection and response system 200 with which embodiments of the disclosed technology may be implemented. One of ordinary skill in the art reading this description will understand how the disclosed embodiments can be implemented with vehicle platforms.

FIG. 3 illustrates non-limiting, example parameters which can be factors 300 that can contribute to the macro state level of a vehicle. As previously alluded to, macro-level decisions, can include decisions on or based on one or more of a vehicle type, time of travel, familiarity (i.e. with the road and/or vehicle), direction of travel, weather condition, traffic situation, road condition, etc. The macro state level can be based on one or more parameters that may affect macro-level decisions. As previously noted, the macro state level can be indicative of a traffic hazard risk in view of the parameters which may lead driver to make various sub-conscious decisions (the macro-level decisions). As such, the various parameters can be contributing factors for the macro state level. The macro state level contributing factors, or parameters that can lead to one or more macro level decisions, can be specific to the vehicle, specific to the driver (such as those related to a driver state), and others can be specific to the road traffic network (driving hazards, traffic, environmental parameters, etc.). FIG. 3, includes example macro-level contributing factors 300, including parameters such as vehicle parameters (e.g. vehicle parameters), driver state parameters (e.g. personal characteristics of the driver), or external parameters (e.g. weather). Factors 300 can include vehicle size, vehicle type, time of day, road type, weather (e.g. temperature, humidity, and/or precipitation), personal characteristics of the driver (such as if the driver is stressed, tired, alter, distracted intoxicated, medicated, angry, and/or calm). Other factors 300 may include characteristics of sensor systems of the vehicle (e.g. sensors 120 shown in FIG. 1 and FIG. 2), such as characteristics of the quality and/or quantity of the sensors (e.g. advanced, basic, few, or none). Other factors 300 may include the age of the driver, characteristics of specific aspects of the vehicle systems 258 (such as a status of tire pressure, brake pad depth, liquids level, suspension, engine, safety equipment, battery condition or battery level). Other factors 300 may include the level of autonomy of the vehicle, and whether the vehicle is connected or unconnected. Other factors can parameters of, or the macro state level for other vehicles in the vicinity (e.g. immediate vicinity, broad vicinity, in a trajectory of the ego vehicle), or other factors corresponding to vehicles and/or drivers in a road traffic network. Other factors can include road condition, traffic condition, and other factors mentioned herein. Generally data from which various values for factors can be based on can be retrieved from one or more data sources (such as databases, maps, vehicles, and/or networking infrastructure of the road traffic network 260). The data can be specific to a local area, a road segment, to a specific mode of transportation (e.g. bicycle versus sedan), or the specific vehicle or driver of the vehicle. It can be understood that values for the one or more factors can be based on data retrieved from a user device, directly from the driver, by observation of the driver sensors of the vehicle, and/or elements of the road traffic network 260 (such as infrastructure, other vehicles etc.).

Figure 4:
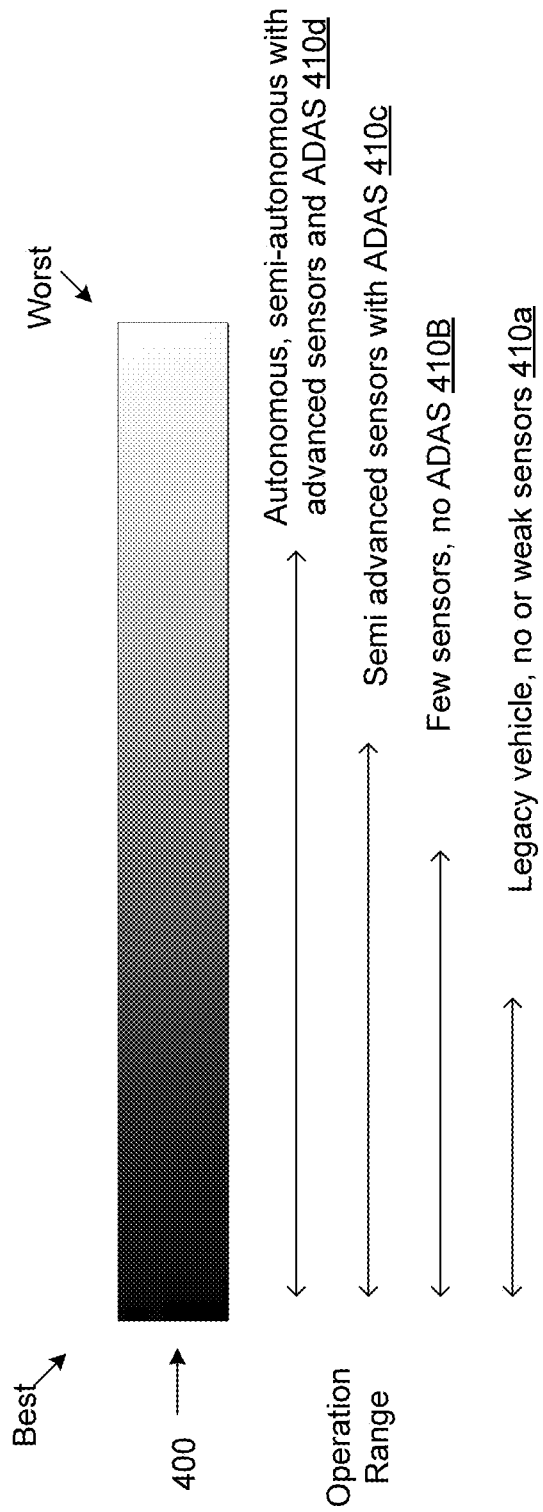
FIG. 4 illustrates the relationship of traffic hazard conditions and varying safe operating ranges for vehicles in those traffic hazard conditions, according to various embodiments described herein.

FIG. 4 illustrates example macro state data and a macro state level according to aspects of the present disclosure. As previously alluded to with reference to FIG. 3 there can be one or more contributing factors to a specific macro state level. The contributing factors can be weighted, and combined to form a macro state having a specific macro state level, or a value for the macro state. In some embodiments, the average of values for the factors can correspond to the macro state. In some embodiments, the factors can be weighted according to an importance. In some embodiments, a first factor can be weighed as more important in contributing to the macro state level than a second factor, unless the second factor has a specific level or value. In some embodiments, factors corresponding to aspects of the vehicle can be weighted more than factors corresponding to the driver. In some embodiments, factors corresponding to aspects of the vehicle can be weighted more than factors corresponding other vehicles. In some embodiments, factors corresponding to aspects of the vehicle can be weighted more than factors corresponding to the driver, unless factors corresponding to the driver are at a specific level.

An example of how traffic hazard conditions relates to a safe operating range for the vehicle is shown in FIG. 4. Vehicles can operate safely, risk free, or medium risk, in varying traffic hazard conditions (modelled by a continuum 400 from best to worse, but generally relating to external factors such as weather, the density of vehicles, etc.), depending on the state of various factors of the vehicle (see generally factors 300). The macro state level is depicted as a continuum with multiple discrete levels between best and worst. A safe operating range for the vehicle in those traffic conditions may depend on one or more factors, such as the technology of the vehicle (e.g. Autonomous, Semi-autonomous, Standard, Legacy, Connected, Unconnected) and the sensors of the vehicle (e.g. few or no sensors). In a first example 410a, if the vehicle is a legacy car, with no, few, or weak sensors, the vehicle may be operated safety when the travel hazard conditions are better (generally the left hand side of the traffic hazard continuum), but not when the traffic hazard conditions are worse. Similarly, in a second example 410b, when there are fewer sensors, and the vehicle has no ADAS (e.g. a legacy vehicle), the a safe operating range may be larger than the first instance. In a third example 410c, a vehicle with semi-advanced sensors and an ADAS can operate in an even larger traffic hazard conditions. In a fourth example 410d, autonomous, or semi-autonomous vehicles, with advanced sensors and ADAS can operate in more varying traffic hazard conditions. A macro state level for the vehicle allows for capturing the risk of driving the vehicle in view of the state of various external factors or factors corresponding to the state of the driver (i.e. factors which can contribute to traffic hazard conditions), and in view of the varying vehicle based factors. In each of the example 410a, the macro state level for a vehicle may be high risk or red when the traffic condition continuum 400 is medium-worse, but the macro state level may be green or low risk for the same traffic condition of the vehicle in example 410d. A macro state level may capturing potential risk and allow for specific vehicle actions in view of various factors and/or events that together may increase or worsen road traffic conditions, or heighten road traffic risk. Whereas the macro state level may allow for a vehicle to respond to general road traffic conditions or better prepare for road traffic risks, in contrast, a micro-level vehicle response may allow a vehicle to respond to specific traffic events.

Generally, the data that can contribute to values for the previously alluded factors 300, can be based on one or more driving data. For example, the data can be retrieved from datasets corresponding to driving data for the specific driver, the specific vehicle (i.e. the vehicle type), or multiple drivers. For example, data corresponding to traffic factors 300 can be based on real-time data from various vehicles. Data corresponding to personal factors 300, can be based on data from one or more prior driving experiences of the driver, and/or based on one or more non-driving related experiences of the driver. Values for time of day based factors can be based on driving data for one or more vehicles (e.g. of the same type as the ego-vehicle, or all types of vehicles). For example, data sets can be based on fatal and/or non-fatal accidents by the time of day. For example, a database can be updated based on an outcome of one or more driving experience.

Figure 5:
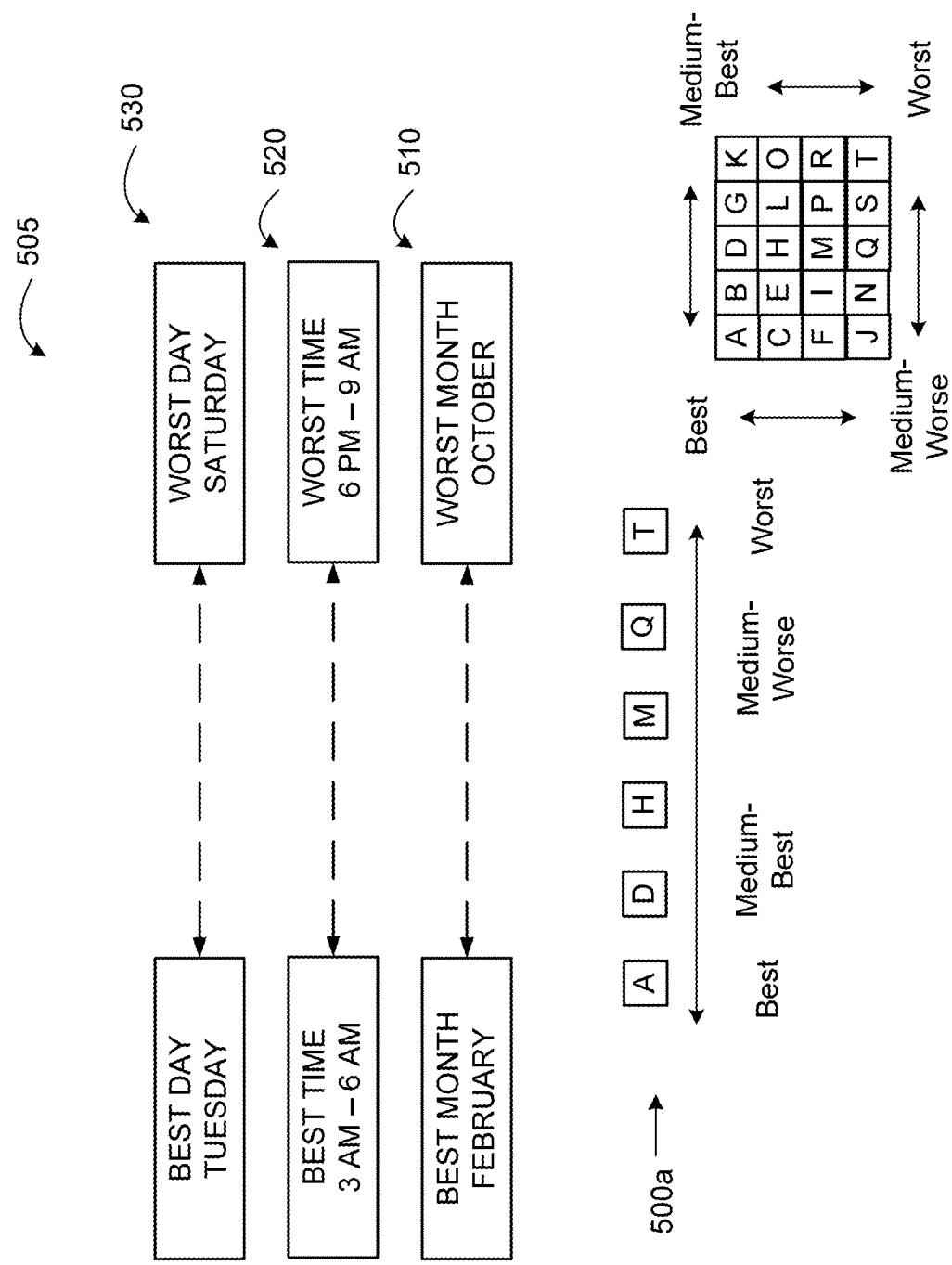
FIG. 5 illustrates example factors that can influence the macro state level, and example macro state levels, in accordance with one or more implementations.

The data for the previously mentioned factors 300 can have corresponding macro-level. The data for the previously mentioned factors 300 can be broken down into various granular sub-factors. As previously alluded to, time of day is a non-limiting example of a factor that can contribute to the macro state level. Referring now to FIG. 5, FIG. 5 shows the macro state level based on time of day (one example factor), with the time of day broken down into granular levels. The macro state level can also be broken down into two or more discrete levels (e.g. five or more, 25 or more, 50 or more, 100 or more, etc.). For example, macro state level 500a shows six discrete levels, whereas macro state level 500b shown 25 discrete levels. The levels can correspond to levels from best to worst. Each level can a corresponding visual cue or indication. Some non-limiting examples for visual cues or indications can include combinations of corresponding color(s), pattern(s), shape(s), and/or texture(s). In some embodiments, the visual cue for the best level correspond to shades of green, visual cues for medium levels correspond to shades of yellow, and visual indicators corresponding to the worst levels correspond to shades of red. In some embodiments, a density of visual elements of the visual cue (such as dots, lines, or hashes), can increase or decrease depending on the level. Corresponding visual ques are exemplified with letters in FIG. 5. Each level can also have a corresponding label. For example, the labels can be worst, medium-worst, medium-best, and best. The labels can be zero to one hundred percent, or 100 percent to zero percent. The labels can include the letters A through K. The label can include the name of the color. The labels can be 1 to 10 in ten levels, 10 to 1 in 10 levels, violet to red in ten increments, three shades of red corresponding to worst, three shades of yellow corresponding to medium, and three shades of green corresponding to best macro state level, etc. Audible cues can include an audible indication of the level. Visual cues can include visual indications of the level.

With respect to time of day factor 505, the factor 505 can be broken down into various granular sub-factors, with each sub-factor having corresponding levels or values. For example, the sub-factors for time of day factor 505 can include the month 510, time of day 520, and specific day 530 (i.e. day of the week, weekend, and/or holiday). Values for the month 510, time of day 520, and/or specific day 530, can each contribute to the macro state level 500a, 500b. The data from which a value for a time of day factor or sub-factor can be based on can include data corresponding to fatal and/or non-fatal accidents by time of day. The value for the time of day factor can be based on traffic information, for example the number of vehicles on the road on the specific month 510, time 520 and/or day 530. The value for the time of day factor can be based on fatality information, for example the number of fatalities on the specific month 510, time 520 and/or day 530. The value for the time of day factor can also depend on values for one or more other factors. For example, the time of day can be influenced by the type of vehicle (e.g. accidents by time of day for bicycles can be different than accidents per time of day for trucks), the state of the driver (e.g. based on fatalities per time of day for intoxicated drivers), the specific driver, the specific road segment (e.g. accidents per time of day on rural roads).

The specific time of day (e.g. the time of day at which the macro state level is to be established), can be compared to prior data (e.g. a baseline, an average, or weighted average), and the result of the comparison can be used to compare or adjust the level. Adjusting the level can include disabling, enabling, or escalating the level. For example, for a specific location (e.g. a specific road, intersection, or neighborhood), the data may show that there are the least amount of accidents (fatal or otherwise), Tuesdays, 3-6 am, in February, and that there are the most accidents on Saturdays, at 6 pm-9 pm, in October. As such, a value of Tuesday for the day 530 sub-factor may contribute to a better value for the day sub-level than a value of Saturday for the day sub-factor. In other-words, a value for Tuesday can map to (or contribute to) a better macro state level 500a, 500b than values for Wednesday through Monday.

By comparison to example data, the best day 530, time 530, and month 520 is shown on the left, and hence the sub-factors can have assigned the best rating or level (e.g. a bright green rating). The worst day 530, time 520, and month 510 is on the right and can have assigned the worst rating or level (e.g. a bright red rating). It can be understood that other values for the time of day 505 can falls somewhere in the middle in level. The middle levels can corresponding various shades of red, yellow, and green. It can be understood that overall time of day 505 macro-level can be assigned based on the sub-factors (e.g. by an average), or specific macro-levels can be assigned for the sub-factors. It can also be understood that the time of day factor 505 sub-factors (day 530, time 520, month 510), can each be weighted in their contribution to a time of day factor macro state level. It can also be understood that the time of day factor 505 can contribute overall to an overall macro state level for the vehicle or driver.

As such, referring back to FIGS. 3-5, an overall macro state level include one or more macro state levels, across one or more dimensions, with each dimension corresponding to factor-based macro state levels. In some embodiments, the overall macro state level can include six levels. In some embodiments, it can include finer or more granular resolution, e.g. 10, 25, 30, 50 levels. It can be understood that one or more contributing factors can contribute to the overall macro state level, with each contributing factor corresponding to a dimension of the overall macro state level.

As previously alluded to, one or more macro state level alerts can be created based on the macro state level. Alerts can based on the overall macro-level, and/or based on the macro-level contributing factors (e.g. factors 300 FIG. 3, or time of day factor 505 shown in FIG. 5). An overall macro-level alert based on values for the factors 300 can be created. Each alert can be shown as macro and/or micro-level alerts in the car as in FIG. 6A.

Figures 6A, 6B:
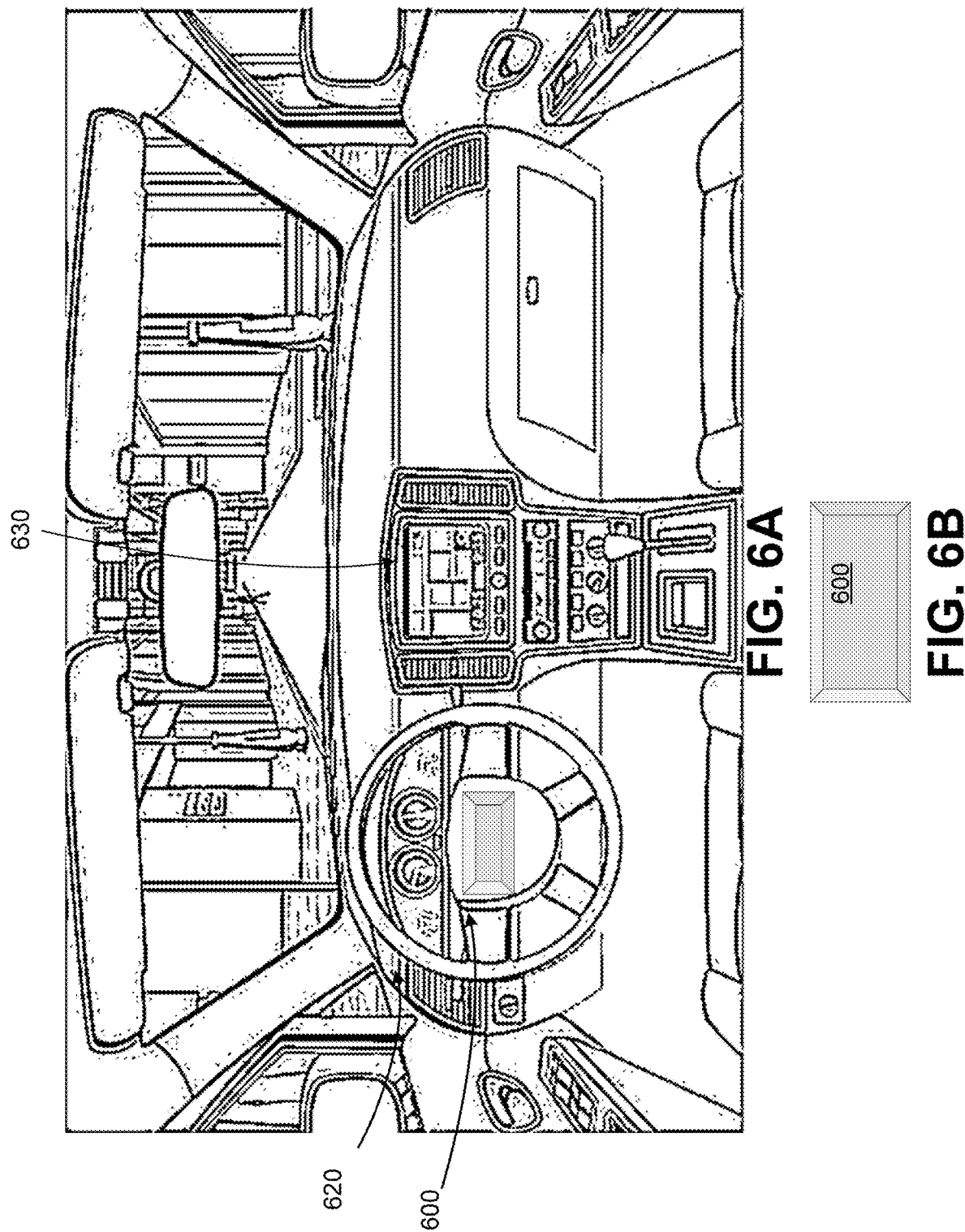
FIG. 6A illustrates an example macro/micro alert according to various implementations described herein.
FIG. 6B illustrates another view of the macro/micro alert of FIG. 6A according to various implementations.

Referring to FIG. 6A, FIG. 6A shows a macro/micro-level 600 alert in an interior of a vehicle. The macro/micro alert 600 can be displayed anywhere in the interior of the vehicle, for example at the steering wheel 620, a dashboard, or a central display console 630. In some embodiments, the alert 600 includes an audible via a speaker in the interior of the vehicle) and/or haptic feedback (e.g. a vibration at the steering wheel and/or seat). The alert e.g. visible, audible, or haptic) can be based on the one or more levels, indication, and/or labels described with reference to FIG. 5. For example, a visible alert can be based on a color indication based on the level, an audible alert can be based on a label (e.g. a dictation of the label or level), and a haptic alert can have an amplitude or frequency of a vibration based on a level. In some embodiments, the alert 600 can include one or more visual indication, that can be green corresponding to a good macro state level, yellow corresponding to a medium risk macro state level, and red corresponding a high risk macro state level.

In some embodiments, one aspect of the macro/micro alert 600 may be based on the macro state level, while another aspect of the macro/micro alert 600 may be based on the micro state level. For example, although a macro state level may be yellow and the visual component of the macro/micro alert 600 may be yellow, a blinking of the macro/micro alert may start only when the vehicle is facing a specific micro-level event (such as when a vehicle ahead of the ego vehicle is too close of the ego vehicle). Similarly, a visual component of the macro/micro alert 600 may be based on the macro state level, whereas haptic and/or audible components may be based on the micro state.

In some embodiments, the micro state level and/or values for various contributing factors to the micro and/or macro state level can contribute to the alert 600. Referring back to FIG. 4, a safe operating state for an advance autonomous and/or connected car can extend into a risky zone or bad road traffic hazard conditions 400. Hence, macro/micro state level of the vehicle can be recalibrated or biased and shown as yellow or remain in a default state for highly connected or adept vehicles (or per the choice of the driver). In some embodiments, the system will not send alerts 600 even if operating in a red micro state because the ADAS can handle the situations that require 'micro' split-second decisions. The state will scream "red alert" and slow down the car. In other embodiments, the micro state can bias the alert so that a bigger alert is sounded or a different corrective action is taken. For example, depending on the micro state, or a value for one of the factors, the alert 500 can be configured to raise a massive alarm. Similarly, other actions can be taken, such as calling for remote services or calling the police, and will not exceed 35 mph or another speed limit.

FIG. 6B shows another view of the macro/micro-level alert 600 of FIG. 6A. FIG. B demonstrates that the macro/micro-level 600 can have more than one visual portions. As shown, the macro/micro-level alert 600 may have various segments, with a more prominent segment and a multiple less prominent (e.g. less central, or smaller segments). It can be understood that the varying segments can be of varying shapes, sizes, elevations, patterns, profiles, and/or positions. One segment can correspond to the macro state level, while one or more other segments can correspond to the micro state level. One segment can correspond to the overall macro state level, whereas one or more other segment(s) can correspond to specific dimensions (e.g. based on specific factors) of the macro state level. For example, a visually prominent portion can correspond to the overall macro state level, whereas other portions can correspond to, for example, weather based macro state level, and time of day based macro-level. These examples are merely non-limiting examples.

In various embodiments, an indication or other action of the vehicle (such as an adjustment of a control input or prevention of adjustment of a control input) can be based on the state of the macro/micro-level alert 600. In some embodiments, a green alert can signify that everything is okay from a "macro" decision level. The driver may continue to make decisions on what to drive, when to drive and what time to drive. In some examples, a yellow or medium risk macro state level can include a blinking light. A blinking light can allow for reminding the driver (and the passengers) that the vehicle is in an alert or medium risk state. In some embodiments, a red alert or high risk macro state level can be accompanied by an audible alarm. The audible alarm can also include a prompt for the driver to act or otherwise fix the problem. The prompt can be a recitation of actions to be taken by the driver. If the driver does not respond to the red alert or the activation of the audible alarm or prompt, then the vehicle can cease motion or drive slowly. In case of an emergency, the driver can be instructed to call emergency services, or the vehicle can disabled and/or the vehicle can call or alert emergency services. In some embodiments, a service vehicle can be called for and/or dispatched.

As previously alluded to with reference to FIG. 2, user devices can include aspects of macro/micro-level state detection and response system 200. For example, user devices can include respective sensors (such as GPS, camera, alcohol, vibration sensors), decision and control circuit (see circuit 203 with reference to FIG. 3), and user interfaces. Macro/micro-level state detection and response system 200, or aspects thereof, can be executed at a user device, for example by execution of one or more applications. In some embodiments, one or more sensors or other circuits of the user device can contribute to the determination of the macro/micro status. For example, a calendar, notification, sensor (e.g. acceleration sensor) at the user device, can contribute to the determination of the driver state, such as that the user is agitated. Moreover, detection of a use of one or more functions of the device, (e.g. while in or around a vehicle), can alert the system of a distracted driver state. In other embodiments, a predicted or selected driving route (and road quality thereof) can be determined based on one or more aspects of the user device.

Figure 6C:
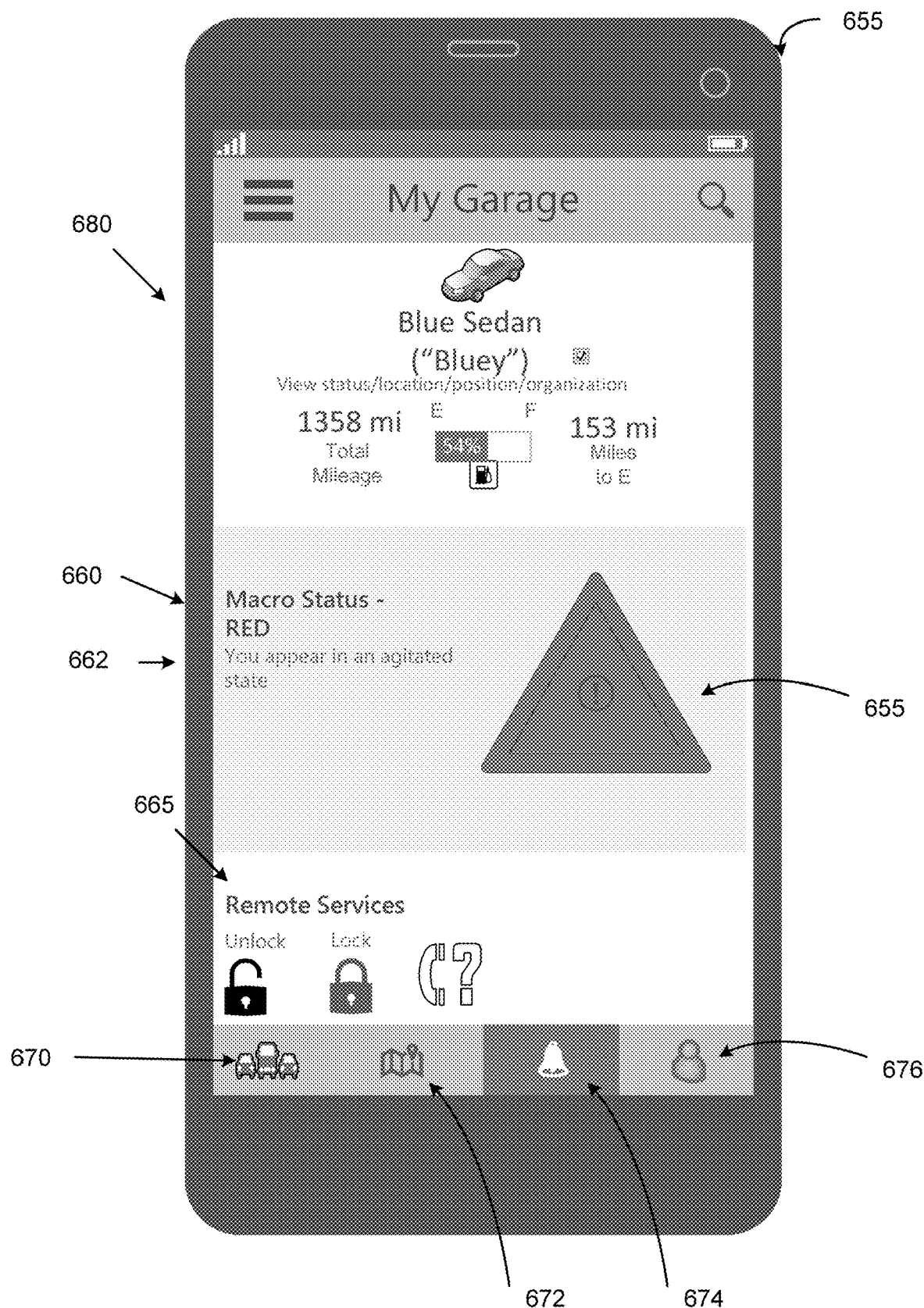
FIG. 6C illustrates another macro/micro alert at a user device, according to various implementations.

It can also be understood that the macro/micro alert can also be displayed at a user device. Referring now to FIG. 6C, FIG. 6C illustrates another macro/micro alert 650 as displayed at a user device 655. User device 655 can allow for display (and/or by other visual, audible, and/or haptic or other feedback) of one or more indications, alerts, or prompts disclosed herein.

Display of a macro/micro alert 650 can be particularly important for legacy vehicle and/or for mixed road traffic networks. On obtaining information probability of an impending crash (see generally FIG. 4, and prediction of road traffic hazards), and generation of a macro state level, and/or upon detection on impeding obstacles (or generally conditions that require micro-level decisions) an ADAS can automatically maneuver the vehicle to safety and/or send an alert to the driver. In case the vehicle does not have an advanced ADAS system, a mobile application executed at the user device 655 can alert the driver of an impending before the driver encounters it. If the vehicle does not have advanced sensors, the driver can similarly be alerted before the driver encounters it by way of distributed information/sensors in the road traffic network. As such, the application can be particularly useful for legacy vehicles. Similarly, instead of a user device, add on devices can be added to the vehicles (particularly legacy vehicles).

One or more indications, alerts, or prompts can be displayed before a user enters a vehicle. In some embodiments, the macro-level can be detected based on a prediction of when a driver will be taking a trip or use a specific vehicle (or by a prediction of the specific vehicle the driver will take).

Macro/micro alert 650 can include one or more distinct regions or portions, each portion having one or more colors. Macro/micro alert can also have one or more icons and one or more shaped. The icons or shaped can be coded to correspond to a value for the level. The macro/micro alert 650 can be similar to macro/micro alert 600. A corresponding label 660 for the macro/micro alert 650 can be displayed. A prompt 662 based on the macro/micro state level can also be displayed. The label 660 and the prompt 662 can be based on one or more macro/micro state levels disclosed herein. In some embodiments, the macro alert level 660 can be a visual indication that the macro status is RED. One example prompt includes "you appear in an agitated state, pull over or slow down." Another example prompt includes "weather and traffic conditions appear bad, manual control will be disabled." Another example prompt includes "weather and traffic conditions appear bad, manual control will be disabled, unless you opt out on three seconds." Another example prompt can be a prompt alerting the driver to select a different vehicle (e.g. a newer, connected, and with ADAS vehicle) includes "the macro status is red, please select a newer vehicle." Another example prompt can including: macro status is yellow: remote services will be dispatched."

In some embodiments, the alert 650 may change depending on if the driver is without the vehicle or not. For example, a user may be predicted to need a vehicle (or by activation of an application of the user), the macro state level may be determined. The alert 650 may be for a yellow state for a specific determined or predicted route. For example, the weather may be rainy, it is 6 pm (rush hour), there are many vehicles and pedestrians on the road, the brakes are at 70%, the tire pressure is okay and the road conditions are potentially slippery due to oil slicks in raining conditions.

Despite the yellow alert or indication 650, the driver may still decide to go on the trip and enters the vehicle. The system 200 may analyzes the driver's physical and mental states (for the first time, or again), and determine that the driver is in an agitated state, possibly trying to rush home. The alert 650 may then change to red as the macro state level is red. The prompt 622 may include an urging for the driver to consider taking a rideshare instead, and even suggest alternate routes, or rideshare drivers. If the driver persists on driving, the vehicle can raise an internal alarm (e.g. audible) to annoy the driver, so the driver does not drive.

The user device 655 can allow for activating and/or disabling remote services 655. As will be described herein, depending on one or more levels for the macro state, remote services can be requested and summoned (or connected to, e.g. by phone), by a user or the vehicle (system 200), or the user device 655. Remote services can be for servicing the vehicle, and/or can provide alternate transportation means to an individual. Further, an emergency contact can be called or dispatched (e.g. the vehicle thereof).

User device 655 (or application thereof), can allow for display and selected of one or more vehicles 670, adding new vehicles, display of mapping and/or navigation services 672, display of notifications 674 (including macro/micro state alert 655), collecting/aggregation of user profiles 676, and display of values for one or more factors 680 that may contribute to the macro/micro state levels described herein. For example, the connected status of the vehicle, the type or name of the vehicle, the mileage, fuel or charge status, tire pressure, etc. can be displayed Display of mapping and/or navigation services 672 can include display of elements of road traffic network, and/or display of road hazard conditions, or aspects that contribute to road hazard condition (see condition continuum 400 shown in FIG. 4). Aspects of mapping and/or navigation service 672 can adjust depending on the macro/micro state level(s). For example, new waypoints can be added (e.g. to roadside services, charging infrastructure, etc.). In other examples, safer routes or higher quality roads can be suggested. Other aspects of the user device can include controls for control mode blending.

FIGS. 7A, 7B, 7C, and 7D show methods 700, 720, 750, 770 that can be performed for determining a macro state of a vehicle. Although the macro state level of a vehicle may be mentioned, it can also be understood that the macro state level of a driver can be determined, especially as drivers become disconnected from specific vehicles and the choices available to drivers for navigating their surroundings increase. The methods 700, 720, 750, 770 can be performed at macro/micro-level state detection and response system 200 (e.g. a decision and control circuit 203) as shown in FIG. 2.

The steps shown are merely non-limiting examples of steps that can be included for generating and reacting to a macro state level as described herein. The steps shown in the methods 700, 720, 750, and 770 can include and/or be included in (e.g. executed as part of) one or more circuits or logic described herein. It can be understood that the steps shown can be performed out of order (i.e. a different order than that shown in FIGS. 7A-7D), and with or without one or more of the steps shown. These steps can also repeat, for example for performing of steps according to updated information. The steps can also be performed according to data of various time points in a time series.

Referring again to FIG. 7A, FIG. 7A shows method 700 for macro state level detection. Method 700 can include step 702 for receiving and updating data. The data can be present values (e.g. from vehicle system 258, and/or from elements of a road traffic network 260 (e.g. from databases, user devices, and/or the vehicle) shown with reference to FIG. 1 and FIG. 2). The data can correspond to values for the parameters which can be macro/micro state level contributing factors 300 shown in FIG. 3.

Method 700 can include a step 704 for determining and setting macro state level. The macro state level can correspond to an overall macro state level for the vehicle, and/or a macro state according to one or more dimensions of the macro state. The macro state level can be generated based on the generated data.

Method 700 can include a step 706 for generating (or adjusting) an indication based on the macro state level. It can be understood that various indications in and around the vehicle (e.g. on a user device) can be based on the macro state level (i.e. the macro state level determined at step 704. Step 706 can include generating macro/micro alert 600 shown with reference to FIGS. 6A-6B, and/or generating macro/micro alert 650 shown in FIG. 6C.

As previously described with reference to FIGS. 1 and 2, a control input or vehicle control signal (such as a vehicle control input, e.g. for vehicle system 258 shown in FIG. 2) can be generated. Step 708 can include adjusting one or more control inputs of the vehicle based on the macro state level. If step 708 is executed at a user device (e.g. user device 655), step 708 can include adjusting and/or disabling one or more aspects of the user device (e.g. user device 655). Step 708 can include preventing the adjustment of a control input of the vehicle according to the macro state level. Step 708 can include preventing the adjustment of a human control input of the vehicle according to the macro state level. Step 708 can include adjusting a control mode of the vehicle (see control mode blending with respect to FIG. 1). Step 708 can include adjusting the control input based on human control input. For example, the alert of step 706 can include a prompt for a driver to take an action. In embodiments, the control input is only adjusted if a driver takes that action (or not). In some embodiments, the control input is only adjusted if a driver takes that action (or not) within a specific time window. The time window can depend on the macro and/or micro state level. It can be understood that indication (step 706) and the control input (step 708) can also depend on the micro state of the vehicle. The macro state level can be the determined macro state level at step 704.

It can be understood that one or more data (e.g. the data from step 702) can be updated based on the determination of one or more aspects of the macro state level at step 704, a determination of the micro state level, an outcome of adjusting the control input based on the macro state level at step 708. It can also be understood that one or more training sets, baselines, circuits, models, machine learning models described herein can be adjusted.

Figure 7A:
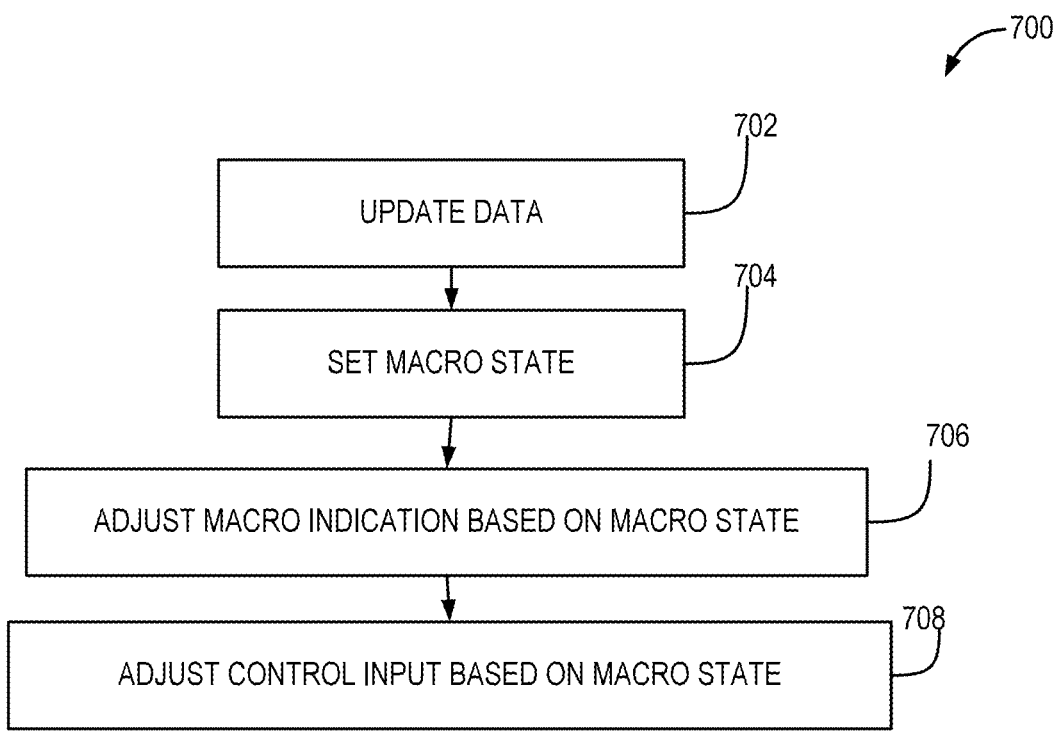
FIG. 7A shows a method for macro-level detection and alert generation according to various embodiments described herein.
Figure 7B:
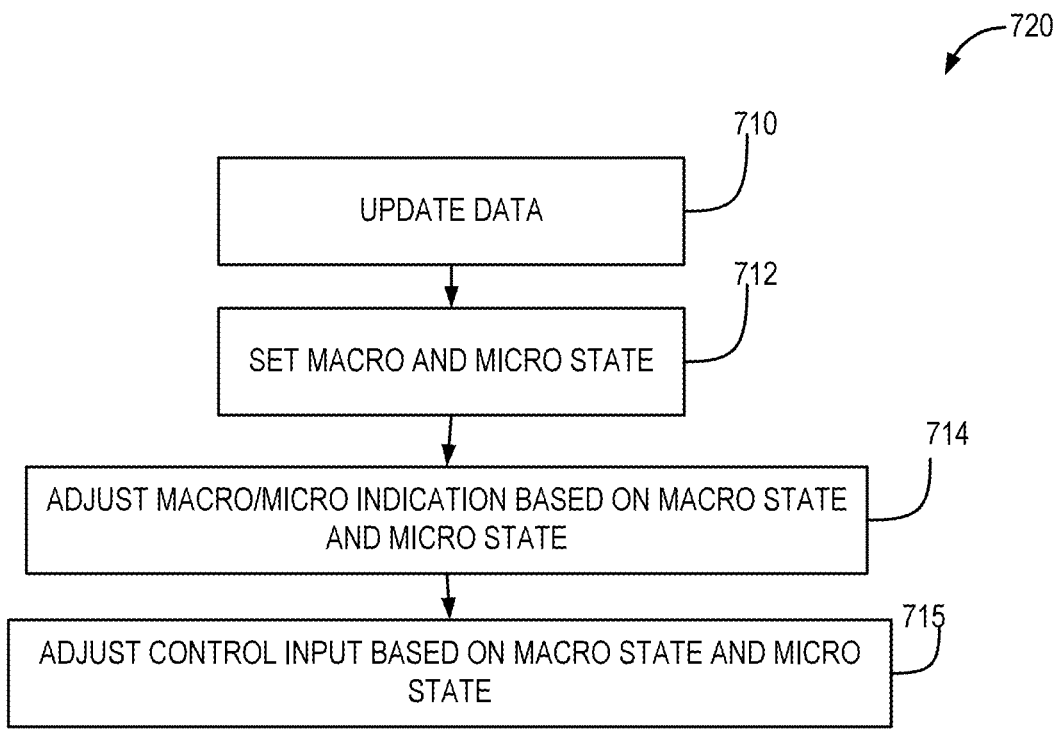
FIG. 7B shows a method for macro/micro state level detection and alert generation according to various embodiments described herein.

FIG. 7B illustrates another method 720 for generating macro state level for a vehicle. Method 720 Method 720 can include step 710 for updating one or more data. The data can include the data referenced to step 702 in FIG. 7A, but can also include data related to and/or important for reacting to micro-level events. For example, the data can include information from one or more sensors 120 with respect to FIG. 1 and FIG. 2. Method 720 can include step for setting and/or adjusting a macro state level and setting and/or adjusting micro state level. In some embodiments, the macro state level can depend on the micro state level. It can be understood that steps 710 and 712 can be perform piecewise for the macro and micro-levels. Method 720 can include step 714 for adjusting a macro and/or micro indication based on the macro and micro state. In embodiments, step 714 can include generating macro/micro alert 600 shown with reference to FIG. 6A, and/or macro/micro alert 650 shown with reference to FIG. 6C.

Method 720 can include a step 715 for adjusting a control input based on the macro state level and the micro state level. Step 715 can include step 708 shown with reference to FIG. 7A. In some embodiments, the control input is only adjusted based on human control input. In embodiments, the control input is only adjusted if a driver takes that action (or not). In some embodiments, the control input is only adjusted if a driver takes that action (or not) within a specific time window. The time window can depend on the macro and/or micro state level.

It can be understood that one or more data (e.g. the data from step 710) can be updated based on the determination of one or more aspects of the macro/micro state level at step 712, an outcome of adjusting the control input based on the macro state level at step 715, and/or a detected action of the driver. It can also be understood that one or more training sets, baselines, circuits, models, machine learning models described herein can be adjusted. For example, the weights for various factors can be adjusted. In some embodiments, a micro-level state can be determined to verify the macro-level state and the data can be adjusted accordingly.

Figure 7C:
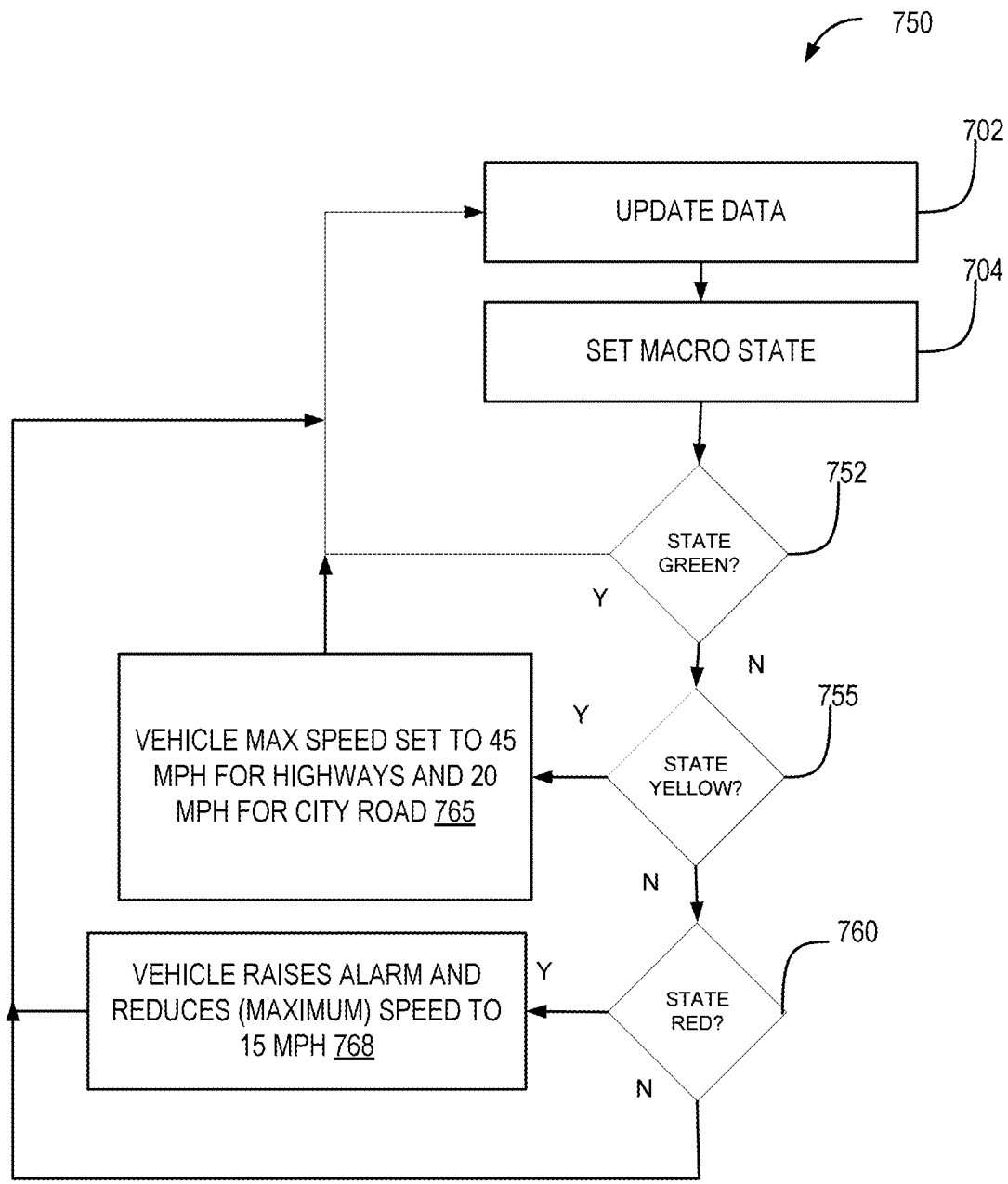
FIG. 7C shows a method for macro/micro state level detection, alert, and vehicle response according to various embodiments described herein.

FIG. 7C illustrates another method 750 for generating macro state level for a vehicle. Method 750 can allow for generating a macro state level and reacting to the macro state level. Method 750 can include steps 702 and 704 described with reference to FIG. 7A, including step 702 for updating data and step 704 for setting and/or adjusting the macro state level based on the data. Alternatively or additionally, method 750 can include steps 710 and 712 described with reference to FIG. 7B, the steps 710 and step 710 supplementing steps 702 and 704 respectively. Method 750 can include more specific implementations of setting and/or adjusting indications based on the macro/micro state level (see step 706 in FIG. 7A and step 714 in FIG. 7B), and/or setting and/or adjusting a control input of a vehicle according to the macro/micro state level (see generally step 708 in method 700 of FIG. 7B and step 715 in FIG. 7B). Method 750 can include specific steps based on the specific level of macro state level and/or the micro state level. Method 750 can include steps 752, 755, 760 for determining whether the macro state level is green, yellow, or red, respectively. If the state is green, the method 750 can update the data and set the macro state level again (see steps 702, 704, respectively). Step 704 for adjusting or setting the macro state level 704 can include setting or adjusting an indication based on the macro state level (such as a visual indication or other alert). It is generally understood that the indication or alert can be based on the overall macro state level, but also the specific state levels for various dimensions of the macro state level, and the micro state level (see various alerts 600 and 650 with reference to FIGS. 6A-6C).

If the state is yellow, the method 750 can include a step 765 for setting or adjusting the maximum (or minimum) speed of the vehicle. The value for the maximum or minimum speed can depend on values for data. For example, prior or current data can show slightly less than half (47%) of all fatal crashes occurring on roadways with speed limit between 45 and 50 mph are in rural areas. Over 70 percent of the fatal crashes on roadways with speed limit of 55 mph or higher occur in rural areas. As such, the maximum speed can be set to a legal or statistically significant speed limit. The maximum speed can be set by a limiter. Step 765 for setting or adjusting the maximum speed of the vehicle can depend on the control mode of the vehicle. The maximum speed can be set for human control inputs. The maximum speed of the vehicle can be set differently depending on values for one or more contributing factors for the macro state (see factors 300 with respect to FIG. 3). In some examples, the maximum speed can be set to 45 MPH for highways, and 20 MPH for city roads. For example, step 765 can include setting the maximum (or minimum) speed for the vehicle based on the type or condition of the road. In another example, step 765 can include setting the maximum speed for the vehicle based on the weather. In some embodiments, the maximum speed can be set depending on the driver state. In some examples, the maximum state can be set, but can be overrun only when a vehicle action is in response to a micro-level decision (or the micro state level). In some embodiments, step 765 is performed until a specific condition is met, such as a specific response from a driver is detected (e.g. within a specific time window that is based on the value for one or more factors). In some embodiments, the data is updated and the macro state level is generated and/or adjusted (see steps 702 and 704 respectively).

If the state is red, or high risk, step 768 can include adjusting the indication or alert. Step 768 can include setting or adjusting a maximum speed (i.e. to a specific level or ranges or levels based on values for one or more factors). In some embodiments, the maximum speed is reduced to 15 MPH. In some embodiments, step 768 include displaying or otherwise indicating one or more alerts that include one or more prompts. Step 768 can include adjusting one or more control inputs of the vehicle based on a driver reaction to the prompt (or not). In some embodiments, step 768 includes adjusting a control input so that the vehicle pulls over. In some embodiments, step 768 includes adjusting a control input so that the vehicle pulls over and emergency services is called. In some embodiments, step 768 includes adjusting a control input so that the vehicle pulls over, but based on the micro state level. In some embodiments, step 768 can include adjusting a control mode or control mode blending of the vehicle. In some embodiments, step 768 includes calling and/or securing an alternate transportation (such as dispatching a ride share, or summoning a vehicle to the driver location), or a spotter vehicle or leader vehicle in connected vehicle applications.

Although method 750 includes steps corresponding to three state levels (i.e. steps 752, 755, 760, 765, 768), it can also be understood that various methods and systems described herein can react to two or more (five or more, ten or more) state levels. It can also be understood that one or more, two or more, five or more, ten or more thresholds can be set for the overall macro state level, the various dimensions of the macro state level, and/or the micro state. One or more indications, alerts, and/or control inputs can be set or adjusted based on a comparison of the respective levels and the various thresholds.

Figure 7D:
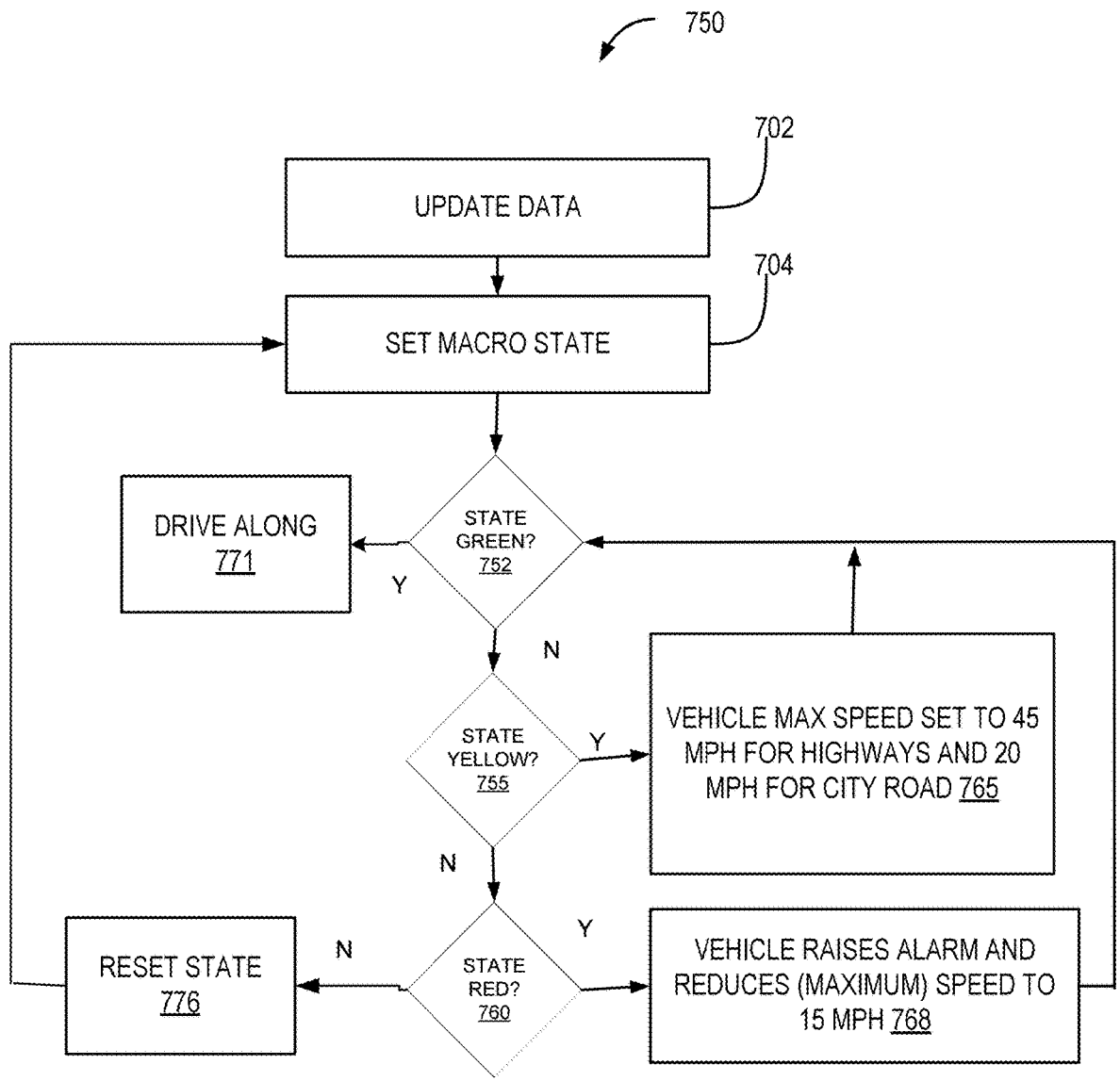
FIG. 7D shows an alternative embodiment to the method of FIG. 7C, according to various aspects of the present disclosure.

FIG. 7D shows a method 770 that is similar to the method 750 FIG. 7C, but the data can be continuously updated. Further, the states can be continuously updated/compared to various thresholds. If at step 752 it is determined that the determined state is green, step 771 includes displaying (or otherwise presenting an indication) to drive along. The data and/or macro state level can then be determined or updated. If the state is yellow or red, the comparison process can repeat. If the state is not green, yellow, or red, the state can be reset at step 776.

Figure 8:
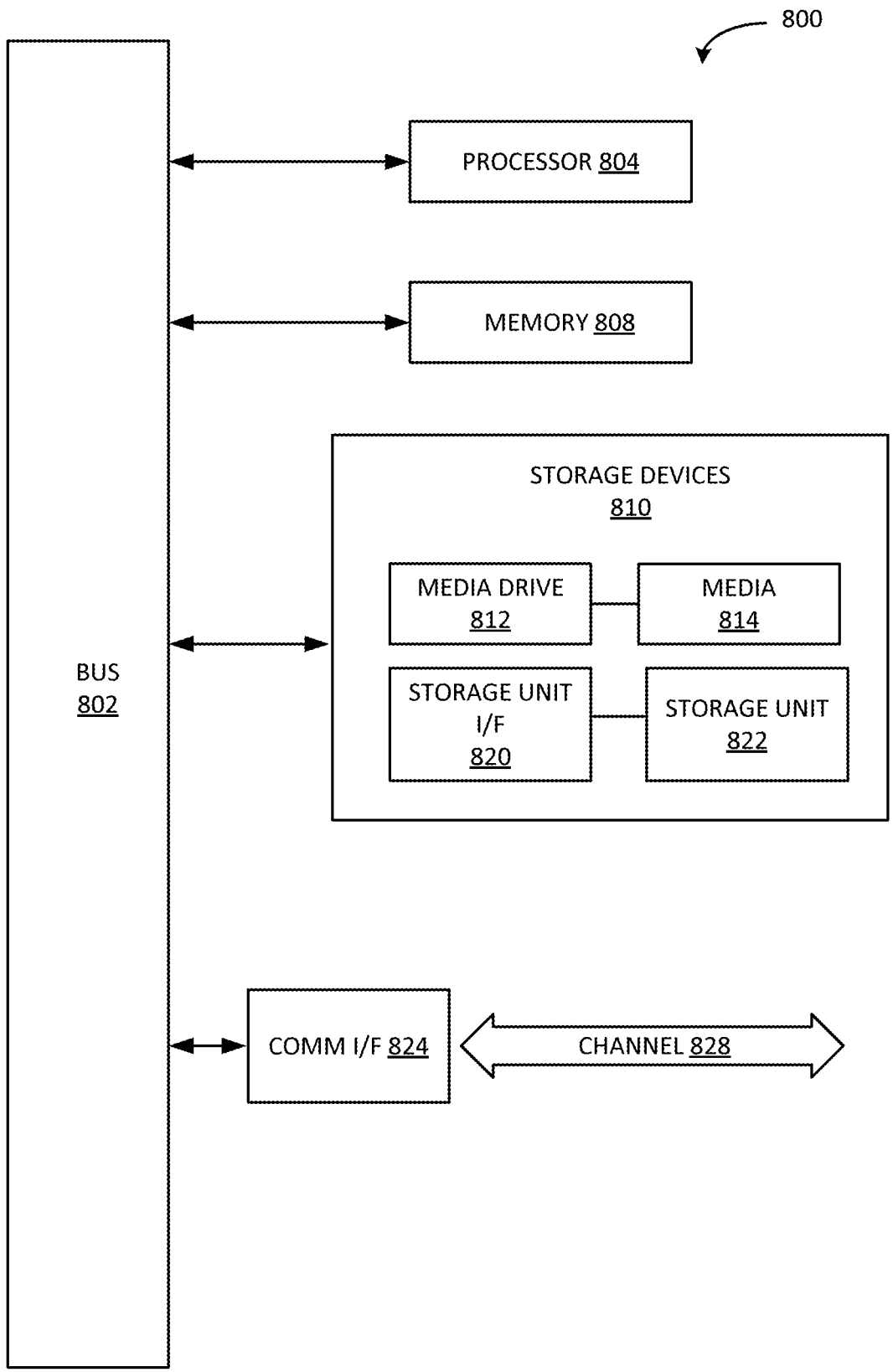
FIG. 8 shows an example computing component within which aspects of the present technology may be implements.

As used herein, the terms circuit, system, and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software (such as user device applications described herein with reference to FIG. 6C), these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a vehicle (e.g. vehicle 100), user device (such as user device 655), self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability. For example, a computing component might be found in components making up vehicle 100, user device 655, macro/micro-level state detection and response circuit 210, decision and control circuit 203, computing system 110, ECU 125.

Computing component 800 might include, for example, one or more processors, controllers, control components, or other processing devices. Processor 804 might be implemented using a general-purpose or special-purpose processing engine such as, for example, a microprocessor, controller, or other control logic. The processor might be specifically configured to execute one or more instructions for execution of logic of one or more circuits described herein, such as macro/micro-level state detection and response circuit 210, decision and control circuit 203, and/or logic for control systems 130. Processor 804 may be configured to execute one or more instructions for performing one or more methods, such as method 700 described in FIG. 7.

Processor 804 may be connected to a bus 802. However, any communication medium can be used to facilitate interaction with other components of computing component 800 or to communicate externally. In embodiments, processor 804 may fetch, decode, and/or execute one or more instructions to control processes and/or operations for enabling vehicle servicing as described herein. For example, instructions can correspond to steps for performing one or more steps of method 700 shown in FIG. 7.

Computing component 800 might also include one or more memory components, simply referred to herein as main memory 808. For example, random access memory (RAM) or other dynamic memory, might be used for storing information and instructions to be fetched, decoded, and/or executed by processor 804. Such instructions may include one or more instructions for execution of methods 700, 720, 750, 770 and/or for execution of one or more logical circuits described herein. Instructions can include instructions 209, and/or 108 as described herein, for example. Main memory 808 might also be used for storing temporary variables or other intermediate information during execution of instructions to be fetched, decoded, and/or executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communication port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

As described herein, vehicles can be flying, partially submersible, submersible, boats, roadway, off-road, passenger, truck, trolley, train, drones, motorcycle, bicycle, or other vehicles. As used herein, vehicles can be any form of powered or unpowered transport. Obstacles can include one or more pedestrian, vehicle, animal, and/or other stationary or moving objects. Although roads are references herein, it is understood that the present disclosure is not limited to roads or to 1d or 2d traffic patterns.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, or C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof. While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order, and/or with each of the steps shown, unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method for determination of a macro state level of a vehicle, the method comprising:
   receiving one or more values for a parameter set, the parameter set comprising a vehicle parameter, wherein the vehicle parameter comprises non-maneuvering vehicle characteristics;
   generating the macro state level indicative of a traffic hazard risk based on the received one or more values, wherein the macro state level corresponds to a driver subconscious decision; and
   generating an alert based on the macro state level.

2. The method of claim 1, further comprising, generating a control signal for a vehicle based on the macro state level.

3. The method of claim 2, wherein the control signal for the vehicle prevents control of the vehicle by a driver.

4. The method of claim 3, wherein the control signal for the vehicle adjusts the alert based on an autonomy level of the vehicle.

5. The method of claim 2, further comprising: detecting, by a perception system, a micro state level indicative of an immediate hazard requiring a short term vehicle maneuver, and wherein the generated control signal is configured to disable control of the vehicle in response to detection of the micro state level.

6. The method of claim 2, further comprising:
   updating the one or more values for the parameter set and the macro state level; and
   generating the control signal only after escalation of the macro state level.

7. The method of claim 2, wherein the control signal for the vehicle is a maximum speed for the vehicle, and where the maximum speed depends on a value for the one or more parameters.

8. The method of claim 2, further comprising, updating the one or more values for the parameter set based on an outcome of performing a vehicle maneuver according to the control signal.

9. The method of claim 1, further comprising, comparing the received one or more value for the parameter set to a dataset, and generating the macro state level based on the comparison.

10. The method of claim 1, wherein the parameter set includes the vehicle parameter comprising a value for an autonomy level of the vehicle.

11. The method of claim 1, wherein the parameter set further comprises external parameter, driver state parameter, and a time of day parameter.

12. The method of claim 1, wherein the vehicle parameter further comprises driving vehicle characteristics.

13. The method of claim 1, wherein the non-maneuvering vehicle characteristics comprise vehicle age, vehicle color, vehicle size, and aspects of vehicle system, including tire pressure, brake pad depth, liquids level, suspension, engine, safety equipment, battery condition.

14. A vehicle, comprising:
a memory storing machine-executable instructions; and
a processor configured to access the memory and execute the machine-executable instructions to:
receive one or more values for a parameter set, the parameter set comprising a vehicle parameter, wherein the vehicle parameter comprises non-maneuvering vehicle characteristics and the parameters of the parameter set are indicative of parameters which may lead a driver to make various sub-conscious decisions;
generate a macro state level based on the received one or more values for the parameter set, wherein the macro state level is indicative of a traffic hazard risk in view of the set of the parameters which may lead the driver to make various sub-conscious decisions;
generate an alert based on the macro state level.

15. The vehicle of claim 14, wherein the processor is configured to access the memory and execute the machine-executable instructions to generate a control signal for a vehicle based on the macro state level.

16. The vehicle of claim 15, wherein the control signal for the vehicle is configured to prevent control of the vehicle by a driver.

17. The vehicle of claim 16, wherein the control signal for the vehicle is configured to adjust the alert based on an autonomy level of the vehicle.

18. The vehicle of claim 15, wherein the processor is configured to access the memory and execute the machine-executable instructions to detect, by a perception system, a micro state level indicative of at least one of a driver distraction or an immediate hazard requiring a short term vehicle maneuver, and wherein the generated control signal is configured to disable control of the vehicle in response to detection of the micro state level.

19. The vehicle of claim 15, wherein the processor is configured to access the memory and execute the machine-executable instructions to:
update the one or more values for the parameter set and the macro state level; and
generate the control signal only after escalation of the macro state level.

20. The vehicle of claim 15, wherein the control signal for the vehicle is a maximum speed for the vehicle, and where the maximum speed depends on a value for the one or more parameters.

* * * * *